(12) United States Patent
Ichinose et al.

(10) Patent No.: US 7,636,924 B2
(45) Date of Patent: Dec. 22, 2009

(54) FRAME FOR OPTICAL DISK UNIT AND THE OPTICAL DISK UNIT

(75) Inventors: Katsumi Ichinose, Ogori (JP); Masayuki Shiwa, Kasuga (JP); Masatoshi Takeda, Kasuya-gun (JP)

(73) Assignee: Panasonic Corporation, Osaka (JP)

( * ) Notice: Subject to any disclaimer, the term of this patent is extended or adjusted under 35 U.S.C. 154(b) by 895 days.

(21) Appl. No.: 11/171,298

(22) Filed: Jul. 1, 2005

(65) Prior Publication Data
US 2006/0005212 A1 Jan. 5, 2006

(30) Foreign Application Priority Data
Jul. 2, 2004 (JP) .............................. 2004-196544
Nov. 2, 2004 (JP) .............................. 2004-318988

(51) Int. Cl.
G11B 17/04 (2006.01)
(52) U.S. Cl. .................................................. 720/601
(58) Field of Classification Search ................ 720/601, 720/600, 653; 360/99.06
See application file for complete search history.

(56) References Cited

U.S. PATENT DOCUMENTS 4,604,666 A * 8/1986 Kitahara et al. .......... 360/99.06

2003/0086358 A1 5/2003 Park et al.
2005/0198654 A1 9/2005 Muta et al.

FOREIGN PATENT DOCUMENTS

| JP | 2001266442 | * | 9/2001 |
| JP | 2001307460 | | 11/2001 |
| JP | 2003151199 | | 5/2003 |

* cited by examiner

Primary Examiner—Angel A. Castro
(74) Attorney, Agent, or Firm—Dickinson Wright PLLC

(57) ABSTRACT

A support frame for an optical disk unit where reduction in thickness and/or weight saving can be realized and the optical disk unit are intended to be obtained.

In an optical disk drive unit, a support frame 2 has neither upper cover nor bottom cover, and is formed from a frame that continuously encloses both sides and a back of a disk tray 1 without any cutout portions in order to secure strength, and furthermore, the support frame 2 is manufactured by a die casting method using a metal material such as aluminum material, zinc material, and magnesium material, or by a press method using a metal sheet such as iron sheet, aluminum sheet, and magnesium sheet, or by composite molding using a polymer such as PPS (polyphenylenesulfide), POM (polyacetal), and LCP (liquid crystal polymer) with the metal sheet, or by a forging method using a metal material such as aluminum, thereby strength that prevents the optical disk drive unit as a whole from distorting or deforming during operation or actuation is secured.

6 Claims, 24 Drawing Sheets

(BEFORE EQUIPPING)

(AFTER EQUIPPING)

(BEFORE EQUIPPING)

(AFTER EQUIPPING)

FRAME FOR OPTICAL DISK UNIT AND THE OPTICAL DISK UNIT

BACKGROUND OF THE INVENTION

1. Field of the Invention

The present invention relates to a frame for an optical disk unit mounted in PC instruments such as personal computer or mobile computer, portable terminal devices, and imaging devices, and relates to the optical disk unit.

2. Field of the Invention

An optical disk unit, which performs reproduction of data from a CD-based optical disk such as CD-ROM, CD-R and CD-RW, a DVD-based optical disk such as DVD-ROM, DVD-R, DVD-RW and DVD-RAM, an optical disk appropriate for blue laser, and other optical disks (hereinafter, abbreviated as optical disk) and/or performs recording of data into the optical disk, is known. Such an optical disk unit is mounted in a computer unit such as personal computer, and for a small-size PC such as laptop PC, an optical disk drive is also tried to be reduced in size and thickness.

Such an optical disk unit has a disk tray which is movable between a loading position and an ejection position of an optical disk with respect to a box-like support frame, and reads data recorded on the optical disk using an optical head placed on the disk tray and a driving mechanism for the head with the disk tray being received in the support frame, and then reproduces the data.

The box-like support frame is configured by fixing a chassis-like upper cover formed into an approximately rectangular shape using sheet metal 0.4 mm to 0.5 mm in thickness to a chassis-like bottom cover formed into an approximately rectangular shape using sheet metal 0.4 mm to 0.5 mm in thickness.

A conventional configuration of the optical disk drive unit for the laptop PC is described in, for example, "JP-A-2001-307460" or "JP-A-2003-151199".

Currently, further reduction in thickness is desired for the laptop PCs, accordingly further reduction in thickness is also demanded for the optical disk unit, however, since the conventional optical disk unit has a configuration where the disk tray is covered by the bottom cover from a bottom and covered by the upper cover from a top, the unit has a critical thickness of 7.5 mm, which has been a problem for achieving the further reduction in thickness.

Moreover, since the optical disk unit is mounted within a chassis of the laptop PC, the bottom cover or the upper cover are not necessary in some internal configurations of the laptop PC, and there has been a problem of disturbing reduction in thickness of the laptop PC itself.

Furthermore, weight saving is required also in electronic instruments, as a result weight saving is also required in an optical disk unit mounted in the electronic instruments.

SUMMARY OF THE INVENTION

Thus, the invention intends to provide a frame for an optical disk unit and the optical disk unit which can realize reduction in thickness (8.0 mm or less) and/or weight saving.

To solve the problems, it is configured that the optical disk unit, comprises a frame having a pair of opposed lateral-portions and a bar-like connecting portion for connecting between the lateral portions, a disk tray provided movably on the frame, a motor provided on the disk tray and rotates an optical disk, and an optical head provided on the disk tray and performing recording and/or reproduction of data by irradiating light onto the optical disk, wherein when the disk tray is stored in the frame, two sides of the disk tray appear.

DESCRIPTION OF THE PREFERRED EMBODIMENTS

Figure 1:
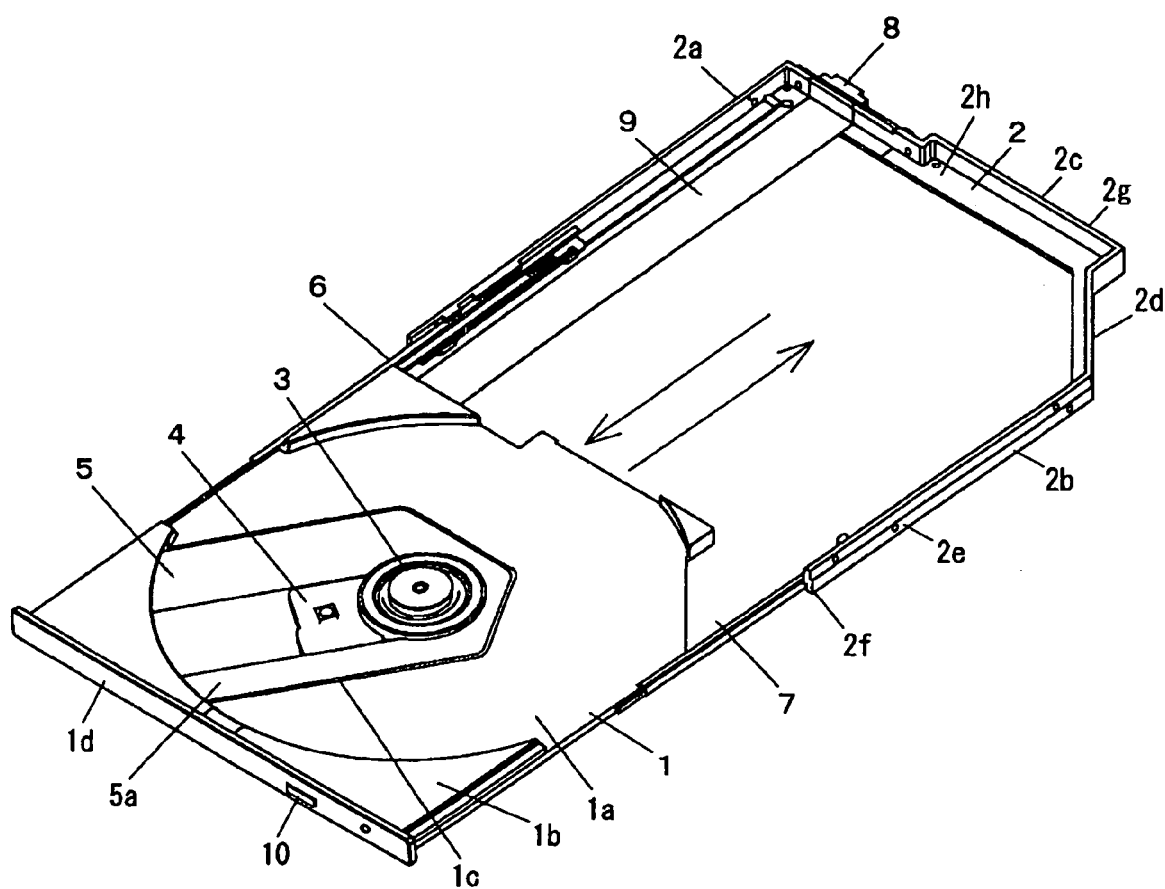
FIG. 1 is a perspective view of the optical disk drive unit in the first embodiment of the invention, when the disk tray is located at the ejection position.

The invention is an optical disk unit characterized by having a support frame, a disk tray that is provided in a movable manner with respect to the support frame and mounted on the frame, a rotational driving section that is provided on the disk tray and rotates an optical disk, and an optical head that is provided on the disk tray and performs recording and/or reproduction of data by irradiating light onto the optical disk, wherein when the disk tray is stored in the support frame, two sides of the disk tray appear. In the configuration, since the disk tray is held by the support frame, an optical disk unit having an extremely small thickness can be formed, and furthermore, since it is supported by a support frame from which useless portions are removed as much as possible, weight saving can be also achieved.

The invention is the optical disk unit characterized in that the support frame is formed from a pair of opposed lateral portions and a connecting portion for connecting between the pair of lateral portions. Accordingly, a support frame having an extremely simple construction can be formed.

The invention is the optical disk unit characterized in that rails are provided between the lateral portions of the support frame and sides of the disk tray so that the disk tray and the support frame are mounted movably to each other. Accordingly, the disk tray can move smoothly with respect to the support frame.

The invention is the optical disk unit characterized in that the support frame is substantially U-shaped, and the disk tray can be inserted/extracted through an opened portion of the support frame. Accordingly, a unit having an extremely simple construction can be made.

The invention is the optical disk unit characterized by having a vertically arranged portion and a projecting portion that is provided integrally with at least partially on the vertically arranged portion and projects inside the support frame. Since a cross section of the support frame can be formed to be approximately L-shaped, mechanical strength of the support frame itself can be improved.

The invention is the optical disk unit characterized in that in the support frame, the lateral portions and the connecting portion are integrally formed. Since there are no connection points between respective members, mechanical strength can be improved, and furthermore, productivity can be improved.

The invention is the optical disk unit characterized in that the support frame is configured by connecting several members to each together. By varying material for each member, for example, one of the members can be formed from a material having high mechanical strength, and other members can be formed from a material that can contribute to the lightweight. Alternatively, since each of the members can be formed approximately rod-like, the number of members that are taken from one sheet material can be increased.

The invention is the optical disk unit characterized in that the support frame comprises at least one of materials of aluminum, zinc, magnesium, polyphenylenesulfide, polyacetal, and a liquid crystal polymer. Accordingly, certain mechanical strength can be maintained, or lightweight can be achieved.

The invention is the optical disk unit characterized in that a cover is provided on the top and/or the bottom of the support frame. Accordingly, a dustproof effect is improved, and the mechanical strength of the support frame itself can be improved.

The invention is the optical disk unit characterized in that a constituent material of the cover is a metal such as iron, aluminum, and magnesium. Accordingly, even if the cover is provided, the lightweight can be realized.

The invention is the optical disk unit characterized in that a tray cover is provided at a side of the disk cover opposite to a side where the optical disk is loaded, and a swelling portion is provided on the tray cover, and an opening is provided in the cover provided on the support frame in such a way that the opening escapes from the swelling portion. The opening is provided in the cover in such a way that it escapes from the swelling portion of the tray cover, thereby the cover does not run on the swelling portion, therefore reduction in thickness can be realized.

The invention is a support frame for an optical disk unit for holding the disk tray in a loadable manner characterized in that a pair of lateral portions and a connecting portion between the pair of lateral portions are provided. Since the disk tray is configured to be held in a simple construction, an optical disk unit having an extremely small thickness can be configured, and furthermore, since the disk tray is supported by a support frame from which useless portions are removed as much as possible, the lightweight can be also achieved.

The invention is the support frame for the optical disk unit characterized by having a vertically arranged portion and a projecting portion that is provided integrally with and at least partially on the vertically arranged portion and projects inside the support frame. In the frame, mechanical strength can be improved.

The invention is the support frame for the optical disk unit characterized in that the lateral portions and the connecting portion are integrally formed. Since there are no connection points between respective members, mechanical strength can be improved, and furthermore, productivity can be improved.

The invention is the support frame for the optical disk unit characterized in that the frame is formed by connecting several members to each together. By varying material for each member, for example, one of the members can be formed from a material having high mechanical strength, and other members can be formed from a material that can contribute to the lightweight. Alternatively, since each of the members can be formed to be approximately rod-like, the number of members that are taken from one sheet material can be increased.

The invention is the support frame for the optical disk unit characterized in that the frame comprises at least one of materials of aluminum, zinc, magnesium, polyphenylenesulfide, polyacetal, and a liquid crystal polymer. In the frame, improvement in mechanical strength and/or lightweight can be achieved.

An invention is a disk unit having a chassis, disk carrying means for carrying a disk that is a recording medium, and connecting means for connecting between the chassis and the carrying means characterized in that when the recording medium is loaded, the disk carrying means is completely removed from the chassis, and the chassis is formed from a die cast or a sheet metal member having improved stiffness through additional drawing. Therefore, the invention has operation that reduction in thickness of the disk unit as a whole and securing of stiffness of the chassis as a whole can be concurrently achieved.

The invention is a disk unit having light-emitting means that emits light for reading data from a disk that is a recording medium or writing the data into the disk, a lens for condensing light emitted from the light-emitting means onto a surface of the disk, a driving device of the lens, an optical base having an electronic component for reading reflected light from the disk, and an optical-base carrying means for reciprocally moving the optical base in a normal direction to the disk; characterized in that the optical base and the light-emitting means are mounted on any portion of a base of the optical-base carrying means. The invention has operation that the light-emitting means, where total height of that component is problematic when thickness of the optical base is tried to be reduced, is disposed in an area other than an area under the disk, thereby reduction in thickness of the disk unit as a whole can be realized.

The invention is the disk unit characterized in that the light-emitting means is mounted via an elastic member on the base of the optical-base carrying means. The invention has operation that the light-emitting means is protected from load, vibration, or shock, which is externally applied to the disk unit.

The invention is the disk unit characterized in that in the base of the optical-base carrying means, a member having excellent heat radiation is used as a material for the base. The invention has operation that heat radiation of light-emitting means and an electronic component for controlling the light-emitting means, which generate plenty of heat, can be effectively performed, and a pickup module and a disk unit which have excellent heat resistance can be realized.

The invention is the disk unit characterized in that a metal material is used for the member having excellent heat radiation. The invention has operation that the heat radiation of the light-emitting means and the electronic component for controlling the light-emitting means, which generate plenty of heat, can be effectively performed, and the pickup module and the disk device which have the excellent heat resistance can be realized.

The invention is the disk unit characterized in that a disk-carrying-means fixation member for fixing the disk carrying means to the chassis is provided, and the disk-carrying-means fixation member is held by a shape memory alloy wire in which a shape is returned to the original by overheating, and the shape of the shape memory alloy wire is returned to the original due to heat generated from the electronic component, thereby the disk-carrying-means fixation member is actuated, and thereby the disk carrying means is released from the fixation to the chassis. The invention has operation that an extremely thin actuator can be formed.

The invention is the disk unit according to characterized in that Joule heat caused by electric current applied to the light-emitting-means driving circuit is used as heat source for restoring the shape memory alloy wire. The invention has operation that an actuator having a further small projection area can be formed.

The invention is the disk unit characterized in that carrying-means fixation-member release means that actuates the carrying-means fixation member to release fixation is provided, and total height of the unit including the chassis is 7.5 mm or less. The invention has operation that it can be mounted on an extremely thin laptop PC which recently appears in the market.

The invention is the disk unit characterized in that a relay board for coupling between a main board contained in the disk unit and an external processor is provided, and the relay board is wound on a winding device applied with predetermined pressure, thereby when the disk carrying means is removed from the chassis, the relay board is prevented from running out of the chassis. The invention has operation that a large area of bottom of the chassis of the disk unit can be cut out, thereby reduction in size and weight saving of the unit as a whole can be realized.

The invention is the disk unit characterized in that the relay board is a windable, flexible board. The invention has operation that the large area of bottom of the chassis of the disk unit can be cut out, thereby reduction in size and weight saving of the unit as a whole can be realized.

The invention is the disk unit characterized in that pressurization force possessed by the winding device of the relay board is pressurization force of total sum of weight of the disk carrying means and the connecting means, a frictional coefficient between the disk carrying means and the connecting means, and a frictional coefficient between the connecting means and the chassis, or less. The invention has operation that tension of the winding device is optimized, thereby the tension is used as auxiliary force when the carrying means is inserted into the chassis, and thereby operation force of a user can be reduced.

The invention is the disk unit characterized in that height including the disk carrying means and the chassis is 7.5 mm or less, and the total height is 12.7 mm or less. The invention has operation that the structures described in respective inventions can be used for the disk drive having the total height of 12.7 mm or less mainly used for the laptop PC and the thin desktop PC (including integrated display/body type).

The invention is the disk unit characterized in that the disk carrying device is a tray, and the connecting means is a rail. The invention has operation that reduction in thickness of the disk unit as a whole and securing of stiffness of the chassis as a whole can be concurrently achieved.

Hereinafter, the best mode for carrying out the invention is further specifically described with reference to drawings. Here, same members are marked with same references, and overlapped description is omitted. Since the description that is made herein is the best mode for carrying out the invention, the invention is not intended to be limited to that mode.

First Embodiment

Figure 2:
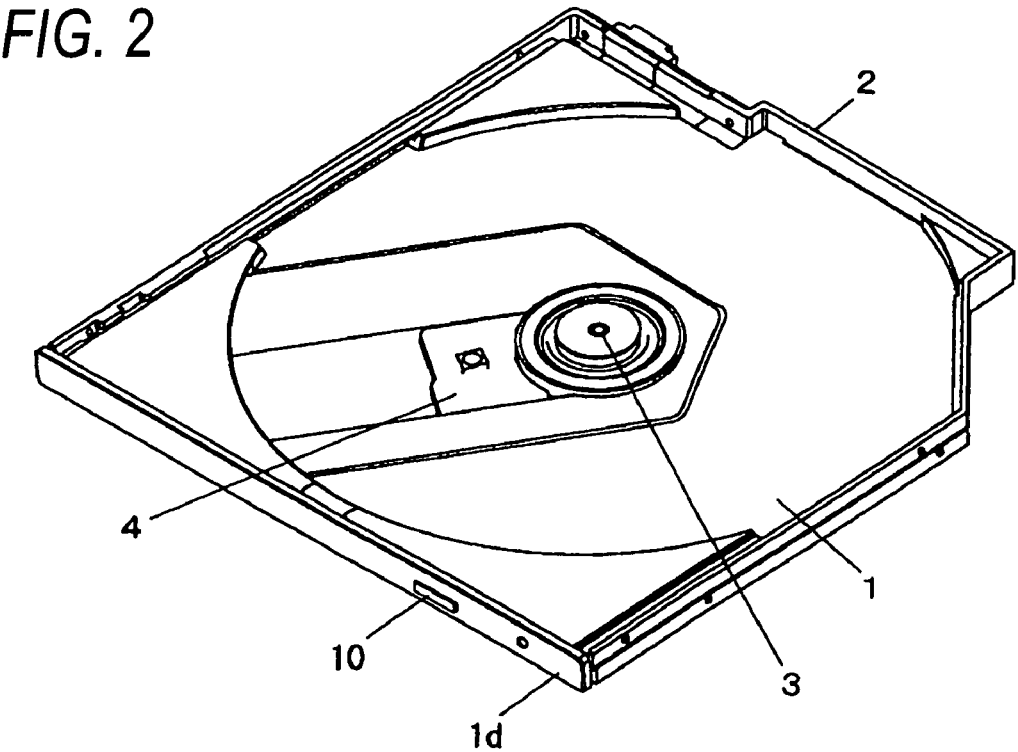
FIG. 2 is a perspective view of the optical disk drive unit of FIG. 1, when the disk tray is located at the loading position.
Figure 3:
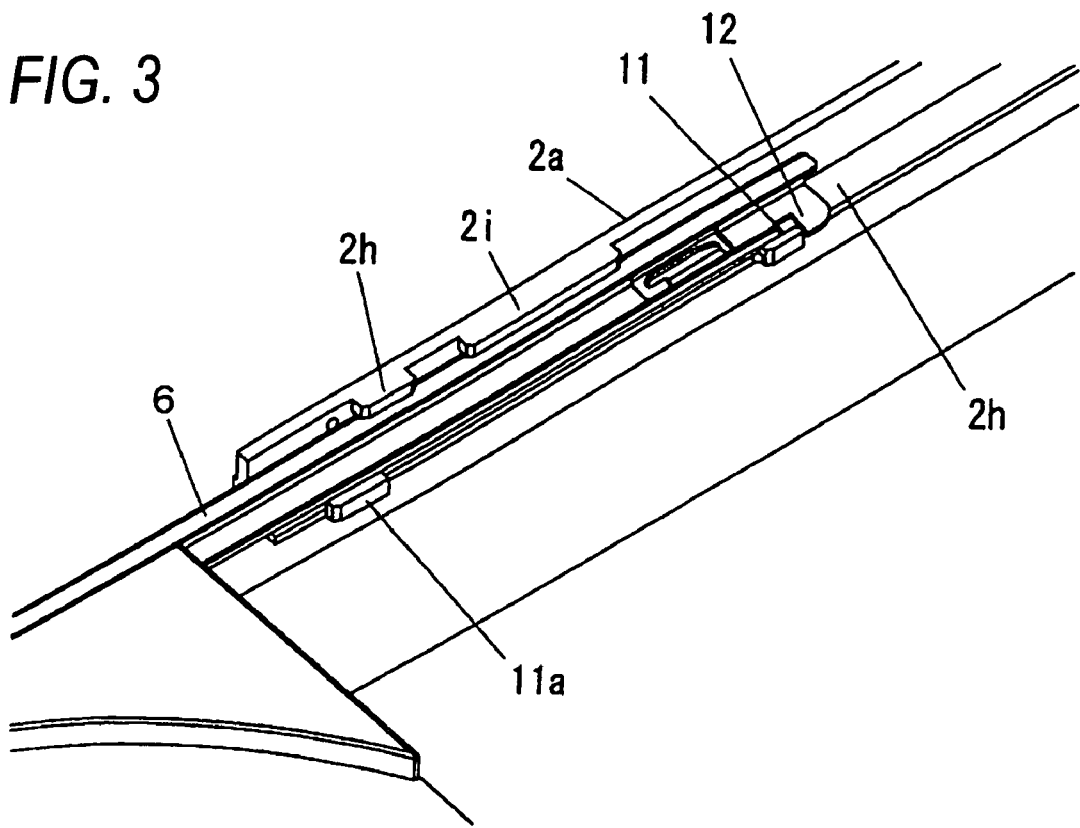
FIG. 3 is a partially enlarged perspective view at a rail side of the optical disk drive unit of FIG. 1, when the disk tray is located at the ejection position.
Figure 4:
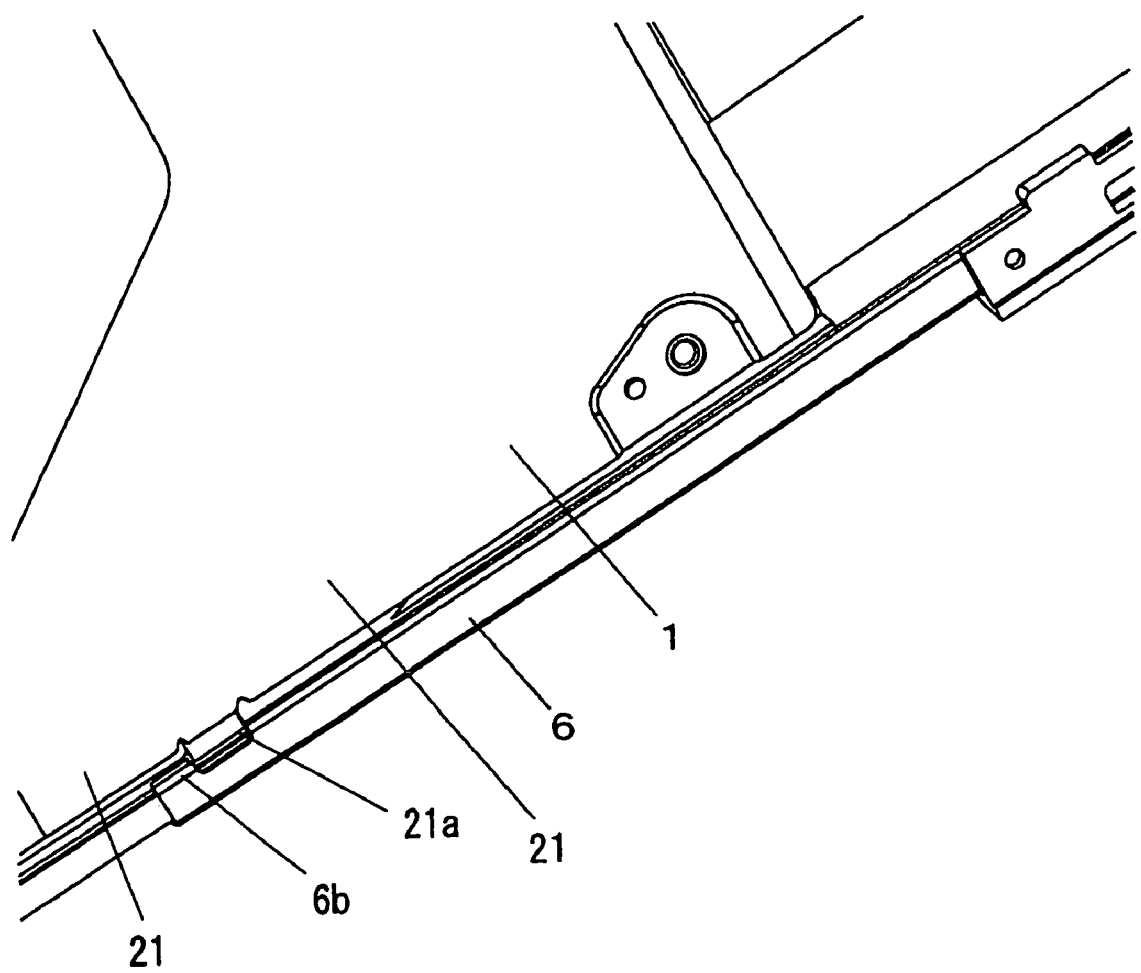
FIG. 4 is a partially enlarged perspective view at the rail side of the optical disk drive unit of FIG. 1, seen from the back, when the disk tray is located at the ejection position.
Figure 5:
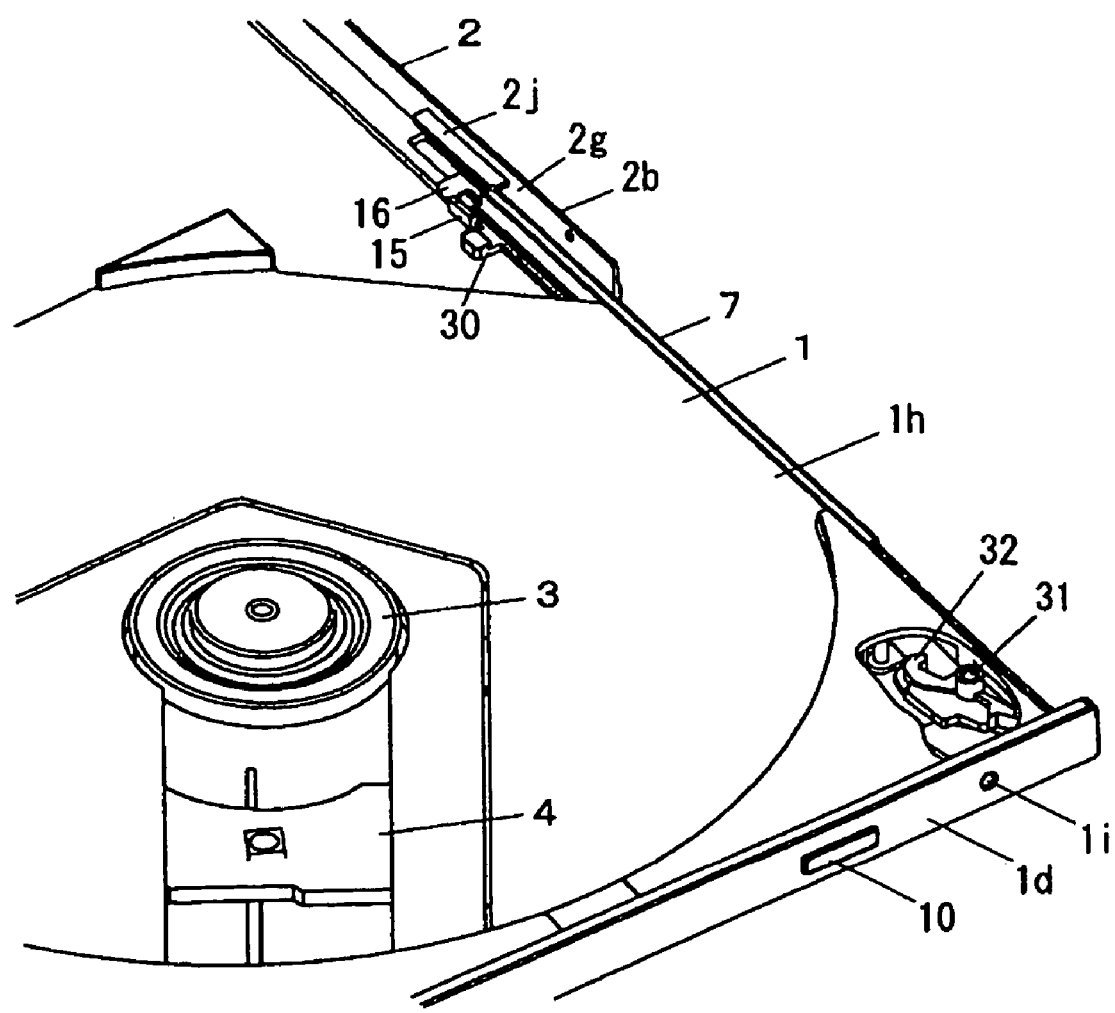
FIG. 5 is a partially enlarged perspective view at the rail side of the optical disk drive unit of FIG. 1, when the disk tray is located at the ejection position.
Figure 6:
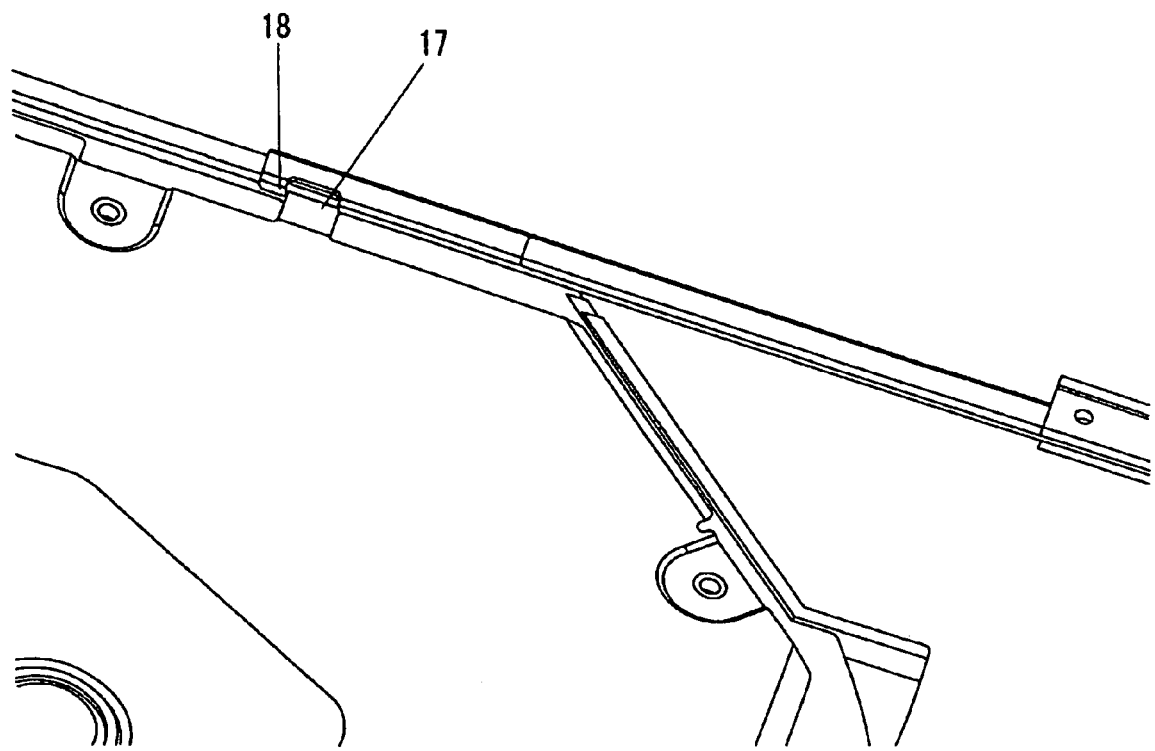
FIG. 6 is a partially enlarged perspective view at the rail side of the optical disk drive unit of FIG. 1, seen from the back, when the disk tray is located at the ejection position.

FIG. 1 is a perspective view of an optical disk unit in a first embodiment of the invention, when a disk tray is located at an ejection position; FIG. 2 is a perspective view of the optical disk drive unit of FIG. 1, when the disk tray is located at a loading position; FIG. 3 is a partially enlarged view of the optical disk drive unit of FIG. 1, when the disk tray is located at the ejection position; FIG. 4 is a partially enlarged view at a rail side of the optical disk drive unit of FIG. 1, seen from a back, when the disk tray is located at the ejection position; FIG. 5 is a partially enlarged view at the rail side of the optical disk drive unit of FIG. 1, when the disk tray is located at the ejection position; and FIG. 6 is a partially enlarged view at the rail side of the optical disk drive unit of FIG. 1, seen from the back, when the disk tray is located at the ejection position.

As shown in FIG. 1, 1 is a disk tray and 2 is a support frame; wherein the support frame 2 has neither upper cover nor bottom cover, and is formed from only a frame enclosing both sides and a back of the disk tray 1 without any cutout portions in order to securing strength, and furthermore, the support frame 2 is manufactured by a die casting method using a metal material such as aluminum material, zinc material, and magnesium material, or by a press method using a metal sheet such as iron sheet, aluminum sheet, and magnesium sheet, or by composite molding using a polymer such as PPS (polyphenylenesulfide), POM (polyacetal), and LCP (liquid crystal polymer) and the metal sheet, or manufactured by a forging method using a metal material such as aluminum material, thereby strength that prevents the optical disk drive unit as a whole from distorting or deforming during operation or actuation is secured. 3 is a rotational driving mechanism for on which an optical disk (not shown) is mounted and rotated; 4 is an optical head arranged movably in a radial direction of the optical disk; and 5 is an optical-head moving mechanism having a feed motor (not shown), which is driven by the feed motor to move the optical head 4 in the radial direction of the optical disk within a predetermined moving range. 6 is a rail that is engaged with a left side of the disk tray 1, in addition, movably seized to the disk tray 1 within a predetermined range, and furthermore, engaged with an inside of a left side of the support frame 2, in addition, movably seized to the support frame 2 within a predetermined range; 7 is a rail that is engaged with a right side of the disk tray 1, in addition, movably seized to the disk tray 1 within a predetermined range, and furthermore, engaged with an inside of a right side of the support frame 2, in addition, movably seized to the support frame 2 within a predetermined range; 8 is an interface connector for exchanging information with an external device (not shown); and 9 is a flexible printed-circuit-board, and the printed circuit board 9 electrically connects between a control board (not shown) mounted on a back of the disk tray 1 and the interface connector 8. At that time, the printed circuit board 9 is in a configuration where it gets over a surface of the support frame 2 from a rear back of the support frame 2 to a rear surface of the support frame 2 having the interface connector 8 thereon. The control board has various electronic components such as integrated circuit (not shown) mounted thereon for all data processing between the optical disk unit and the external device.

As shown in FIG. 2, 10 is an ejection button. When the disk tray 1 is located at the loading position, the printed circuit board 9 is received in a predetermined place (not shown) within the disk tray 1

As shown in FIG. 3, 11 is a seizing claw, which is provided on the support frame 2, for seizing the rail 6, and 12 is a key-shaped portion provided on a rear end of the rail 6.

As shown in FIG. 4, 21a is a seizing claw, which is provided on the disk tray 1, for seizing the rail 6; and 6b is a key-shaped portion provided on a front end of the rail 6.

As shown in FIG. 5, 15 is a seizing claw, which is provided on the support frame 2, for seizing the rail 7; and 16 is a key-shaped portion provided on a rear end of the rail 7.

As shown in FIG. 6, 17 is a seizing claw, which is provided on the disk tray 1, for seizing the rail 7; and 18 is a key-shaped portion provided on a front end of the rail 7.

Next, each of the portions is described in detail.

The disk tray 1, which preferably comprises resin material and the like, has an optical-disk loading area 1a for loading the optical disk, and a shoulder 1b provided outside the optical-disk loading area 1a, which is higher than the optical-disk loading area. The optical-disk loading area 1a is configured to be approximately circular, in addition, configured such that it is slightly larger than an optical disk having the maximum diameter loadable into the optical disk unit. The disk tray further has an opening 1c, and the optical-head moving mechanism 5 appears at least partially from the opening 1c, and the optical-head moving mechanism 5 and the disk tray 1 are fixed by screwing via a damper member, while not shown. The optical-head moving mechanism 5 is configured by mounting the optical head 4 movably held by not-shown shafts, a not-shown feed motor for rotating a drive shaft that is one of the shafts, and a rotational drive mechanism typified by a spindle motor on a not-shown holding member comprising at least a metal sheet or resin. In the embodiment, as shown in FIG. 1, a cover 5a that covers respective portions and comprises the resin or the metal sheet is further provided.

The disk tray 1 has an overall profile configured in an approximately square pattern, in addition, has a bezel 1d attached on a fore end using engaging means or bonding means such as screwing or adhering means such as adhesive.

Next, the support frame 2 is described.

The support frame 2 essentially has at least a bar-like lateral-portion 2a on which the rail 6 is mounted, a bar-like lateral-portion 2b provided oppositely to the lateral portion 2a, on which the rail 7 is mounted, and a bar-like connecting-portion 2c for connecting the lateral portions 2a, 2b at a rear end. In the embodiment, the lateral portions 2a, 2b are provided essentially in an approximately parallel relation, in addition, the connecting portion 2c intersects with the lateral portions 2a, 2b at an approximately right angle. In the embodiment shown in FIG. 1, the lateral portion 2b includes a parallel portion 2e approximately parallel to the lateral portion 2a and a bar-like inclined-portion 2d inclined to the lateral portion 2a.

The support frame 2 is generally formed to be approximately rectangular (or approximately U-shaped), and in a configuration, the disk tray 1 comes in and out through an opened portion 2f.

Regarding respective portions forming the support frame 2, when description is made specifically using the connecting portion 2c as an example, the connecting portion 2c has at least a vertically arranged portion 2g and a projecting portion 2h formed in a way that it projects inside the support frame 2. A cross section of the connecting portion 2c having the vertically arranged portion 2g and the projecting portion 2h is approximately L-shaped. The lateral portions 2a, 2b are configured similarly.

Although the support frame 2 was formed to have an approximately L-shaped section in the almost whole area of the frame in the embodiment, particularly, as long as the connecting portion 2c is formed to be bar-like, various modes can be used, for example, a mode where the connecting portion 2c does not have the projecting portion 2h, and only the lateral portions 2a, 2b have the projecting portions 2h, conversely, a mode where the lateral portions 2a, 2b do not have the projecting portion 2h, and only the connecting portion 2c has the projecting portion 2h can be used. Alternatively, a configuration where the projecting portion 2h is provided at least partially on at least one of the members of the lateral portions 2a, 2b and the connecting portion 2c can be also used. Regarding portions without the projecting portion 2h, cross sections of them can be configured to be an approximately rectangular, circular, elliptic, or polygonal shape, or other shapes.

In the embodiment, it is configured that when an area enclosed by tops of respective vertically-arranged portions of the lateral portions 2a, 2b and the connecting portion 2c and the opened portion 2f is assumed to be S1, and an area enclosed by the lateral portions 2a, 2b and the connecting portion 2c at a side opposite thereto and the opened portion 2f is assumed to be S2, T, which is defined as T=S2/S1, meets 0<T≦1. Thus, in the case of T=1, the opening areas at the top and the bottom of the support frame 2 are equal, and the case of T<1 indicates that the projecting portion 2h essentially has a certain area, and the opening area is small at the bottom of the support frame 2 compared with at a top side. In a conventional technique, T=0, or S2=0 (no opening area) is given at a bottom side. Therefore, as a more preferable example, the projecting portion 2h is provided on the support frame 2 such that 0.78<T<0.95 is given.

As shown in FIG. 3 and the like, even at the top side of the support frame 2, the projecting portions 2h, 2i are provided to hold the rail 6. Although a rail holding member for holding the rail 6 is mounted in a conventional manner, when an optical disk unit having an extremely small thickness (thickness except for the bezel 1 is 9 mm or less) is assumed as an example of the embodiment, the rail 6 is directly supported by the support frame 2. On the projecting portion 2h of the lateral portion 2a, a seizing claw 11 is provided along the vertically-arranged portion 2g forming the lateral portion 2a, and furthermore, as shown in FIG. 3, a guide claw 11a for movably holding the rail 6 is provided on the projecting portion 2h of the lateral portion 2a, and the rail 6 is movably mounted on the support frame 2 by at least the projecting portions 2h, 2i and the guide claw 11a. Although two projecting portions 2h, 2i were provided on the top of the support frame for holding the rail 6 in the embodiment, one projecting portion can be also provided. The projecting portion for holding the rail 6 is preferably formed as long as possible along a moving direction of the disk tray 1. Although the rail 6 was held by the guide claw 11a and the seizing claw 11 at the bottom of the support frame 2, the rail 6 can be held by at least one claw, or another seizing member that does not hold the rail 6 can be provided instead of the seizing claw 11. Similarly at the bottom of the support frame 2, a member (claw) for holding the rail 6 is preferably formed as long as possible along the moving direction of the disk tray 1.

A lubricative material such as fluorine resin may be applied onto the rail 6 and/or a portion of the support frame 2 on which the rail 6 slides in order to improve sliding performance between the rail 6 and the support frame 2.

Figure 11:
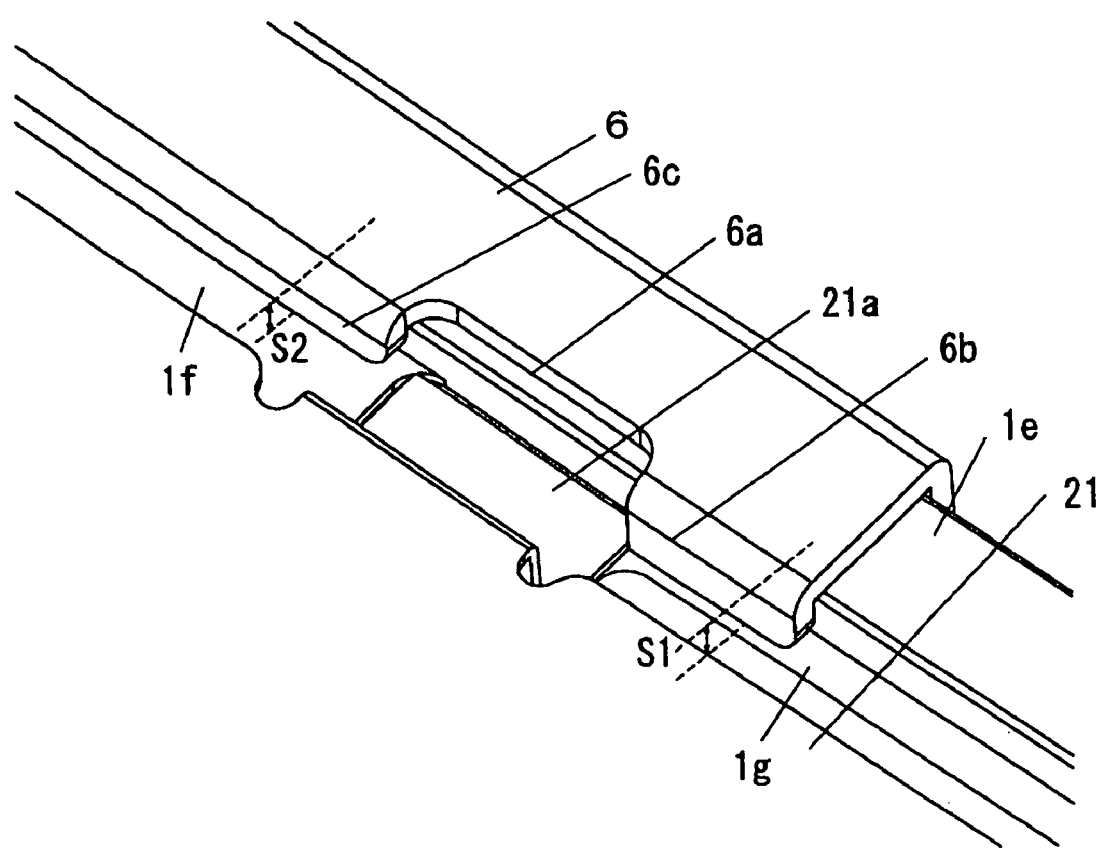
FIG. 11 is a partially enlarged perspective view at the rail side of the optical disk drive unit of FIG. 4, seen from the back, when the disk tray is located at the ejection position.

As shown in FIG. 4 and FIG. 11, the rail 6 having an approximately C-shaped section is mounted on a rail mounting portion 1e provided on a side of the disk tray 1; a concave portion 6a is provided in a cutout pattern at an end of the rail 6; and holding portions 6b, 6c, extending at a tray cover 21 side and in a thickness direction of the disk tray 1, are provided across the concave portion 6a. The holding portion 6b is provided on a tip side of the rail. The holding portion 6c is formed longer than the holding portion 6b, and configured such that the rail 6 is securely mounted on the rail mounting portion 1e. The tray cover 21 has a seizing claw 21a elongated at a rail 6 side. The seizing claw 21a is provided at an end of a depressed portion 1g provided at a side where the rail 6 of the disk tray 1 is mounted, in addition, the seizing claw 21a is formed to have a thickness of which the level is approximately same as that of a shoulder 1f, which is linked to the depressed portion 1g and one step higher than the depressed portion 1g. The height S1 of the holding portion 6b is formed larger than the height S2 of the holding portion 6c, and the holding portion 6c is configured without being caught on the seizing claw 21a. As shown in FIG. 11, the holding portion 6b contacts to an end of the seizing claw 21a at least momentarily and thus restricts movement of the rail 6.

In the embodiment, the seizing claw 21a is provided integrally with the tray cover 21, in addition, the tray cover 21 comprises a material having relatively high mechanical strength such as metal, thereby even if the rail repeatedly strikes against the elongated portion, at least one of the two is hardly damaged. Although the seizing claw 21a is provided integrally with the tray cover 21 in the embodiment, a stopper (corresponding portion to the seizing 21a) can be provided on the disk tray 1, or the elongated portion can be substituted by a different member (screw member screwed into the disk tray 1 and the like) from the disk tray 1 or the tray cover 21.

As shown in FIG. 5, the rail 7 is configured to be shorter than the rail 6 at a lateral portion 2b side of the support frame 2. Thus, the lateral portion 2b side has the inclined portion 2d as shown in FIG. 1 in the embodiment, and the rail 7 is configured to be shorter than the rail 6 by reduced length due to the inclined portion 2d. Moreover, since the rail 7 is formed to be short, the seizing claw 15 integrally provided on the lateral portion 2b is disposed at a position near a side of the opened portion 2f compared with a position of the seizing claw 11 at a rail 6 side. The seizing claw 15 is vertically arranged along the vertically arranged portion 2g of the lateral portion 2b, and movably seizes the rail 7 with the projecting portion 2j extending in an inward direction of the support frame 2 approximately perpendicular to the vertically arranged portion 2g of the lateral portion 2b. The rail 7 is made small in width compared with the rail 6 in order to prevent collision with a loaded optical disk at a side of the end 1h of the disk tray 1. Therefore, the projecting portion 2j is provided at the middle of the vertically arranged portion 2g of the lateral portion 2b (or with a gap above and below the vertically arranged portion 2g).

The key-shaped portion 16 provided at the tip of the rail 7 contacts to the seizing claw 15 at least momentarily, thereby movement of the rail 7 is restricted.

Although the rails 6 and 7 were made differently in length or width from each other in the embodiment, when the inclined portion 2d is not provided, or when striking against the optical disk needs not be prevented, the rails 6 and 7 can be made equal in size.

Furthermore, the lateral portion 2b is integrally provided with the seizing portion 30, and as shown in FIG. 5 (partially perspective view), the seizing portion 30 is engaged with a key portion 32 about a rotational shaft 31, and thus the disk tray 1 is held by the support frame 2. In the configuration, the ejection switch 10 is pressed, thereby not-shown solenoid and the like are activated to rotate the key portion 32, and thereby engagement of the key portion 32 with the seizing portion 30 is released, and thereby at least part of the disk tray 1 is jumped out from the support frame 2 by a not-shown elastic member such as spring. Alternatively, a pin is inserted into a hole 1i provided in the bezel 1d, thereby the key portion 32 is directly rotated, and thereby the engagement of the key portion 32 with the seizing portion 30 can be released.

Figure 12:
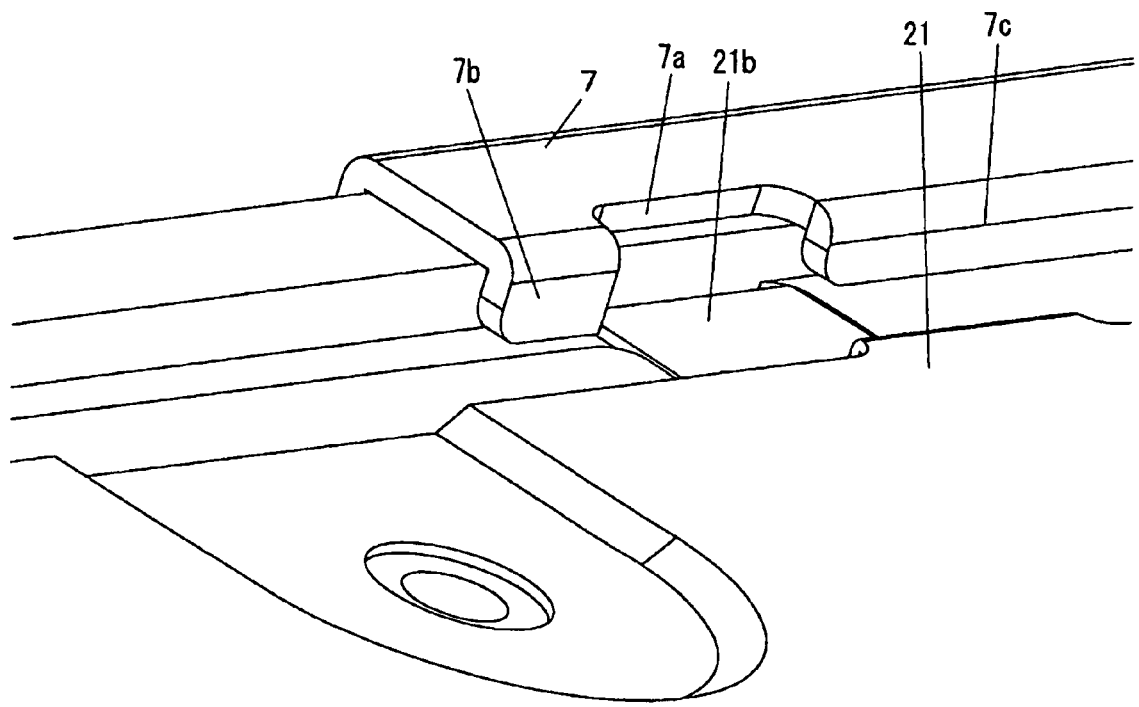
FIG. 12 is a partially enlarged perspective view at the rail side of the optical disk drive unit of FIG. 6, seen from the back, when the disk tray is located at the ejection position.

Similarly at a side of the disk tray 1 of the rail 7, as shown in FIG. 12, an elongated portion 21b integrally formed with the tray cover 21 is provided. A concave portion 7a is provided in the rail 7 similarly as the configuration shown in the case of the rail 6, and holding portions 7b and 7c are provided across the concave portion 7a, and an inner end of the holding portion 7b contacts to the elongated portion 21b at least momentarily, thereby movement of the rail 7 is restricted.

Figure 13:
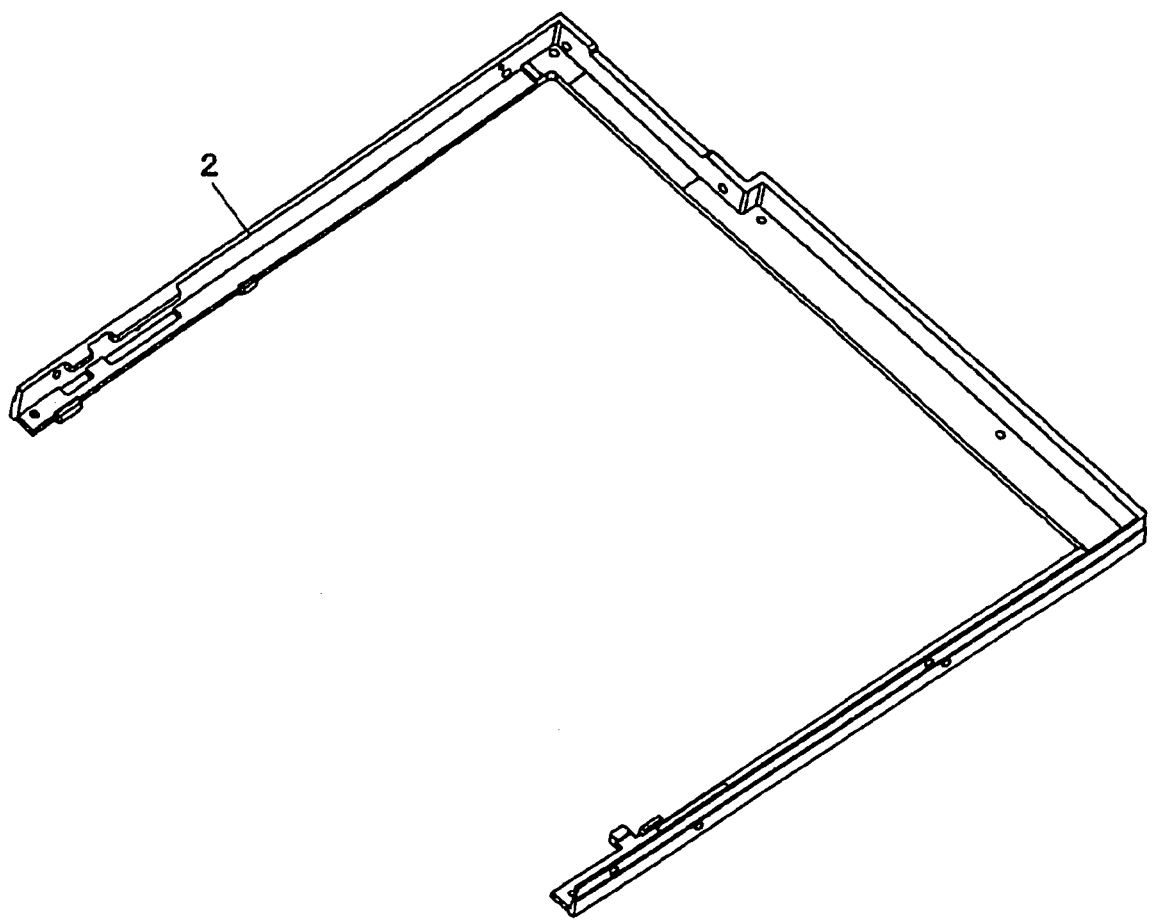
FIG. 13 is a perspective view showing the optical disk unit in another embodiment of the invention.
Figure 14:
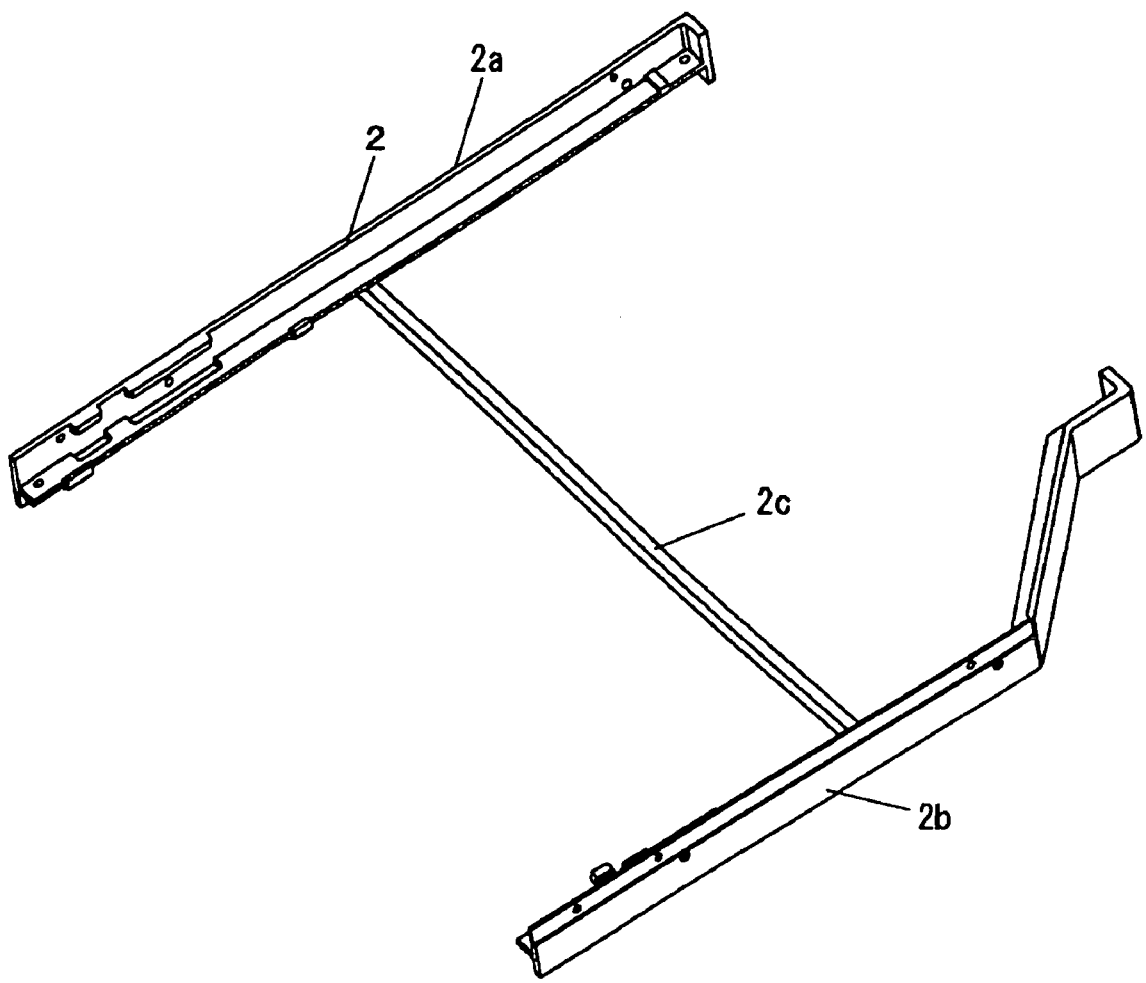
FIG. 14 is a perspective view showing the optical disk unit in another embodiment of the invention.
Figure 15:
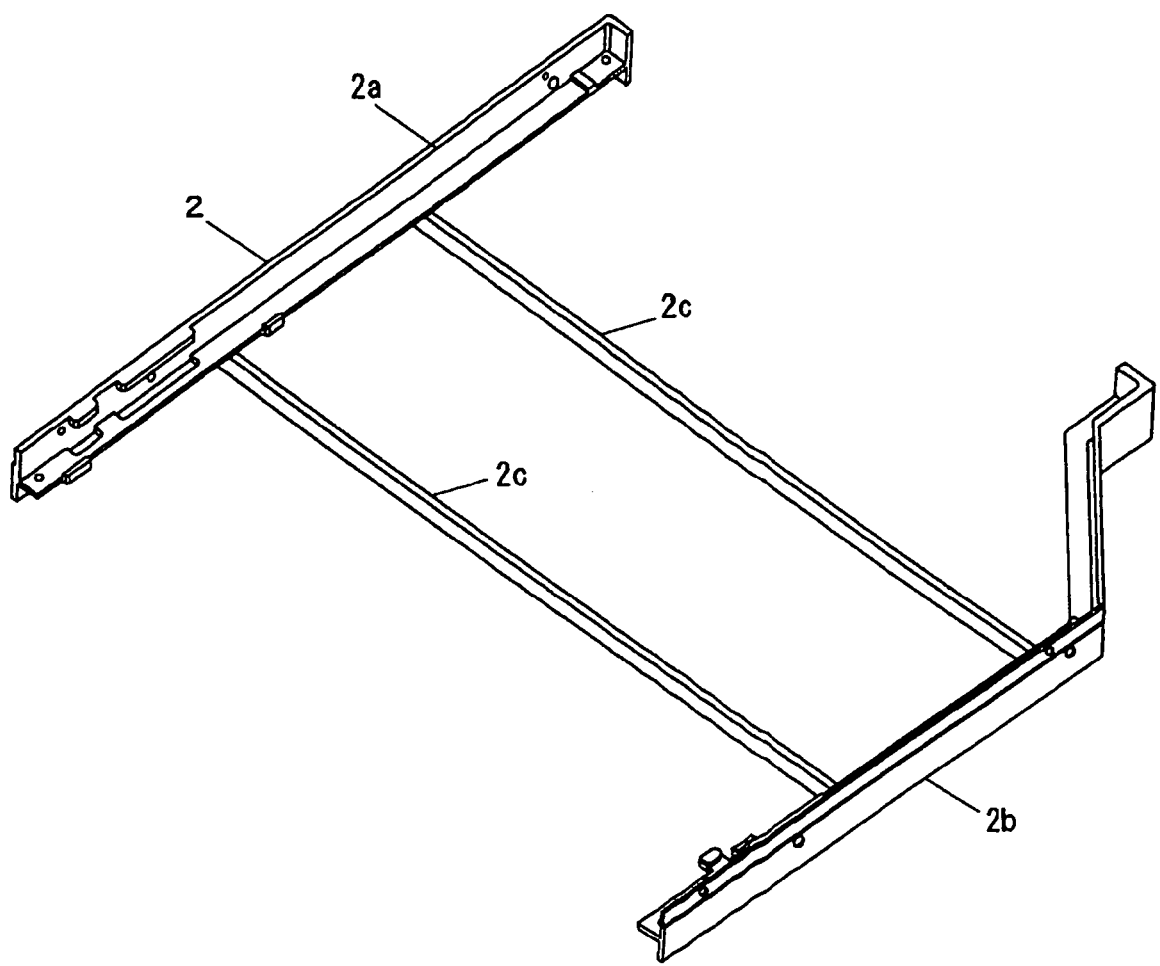
FIG. 15 is a perspective view showing the optical disk unit in another embodiment of the invention.

While the support frame 2 was formed into the configuration as shown in FIG. 1 in the embodiment, the frame can be formed into the U-shaped pattern where the inclined portion 2d is not provided as shown in FIG. 13; and furthermore, the connecting portion 2c can be provided at the middle of the lateral portions 2a, 2b rather than the rear end of the portions, as shown in FIG. 14; alternatively, several connecting portions 2c can be provided at the middle of the lateral portions 2a, 2b as shown in FIG. 15, and in this case, mechanical strength can be improved compared with the structure shown in FIG. 14.

Figure 16:
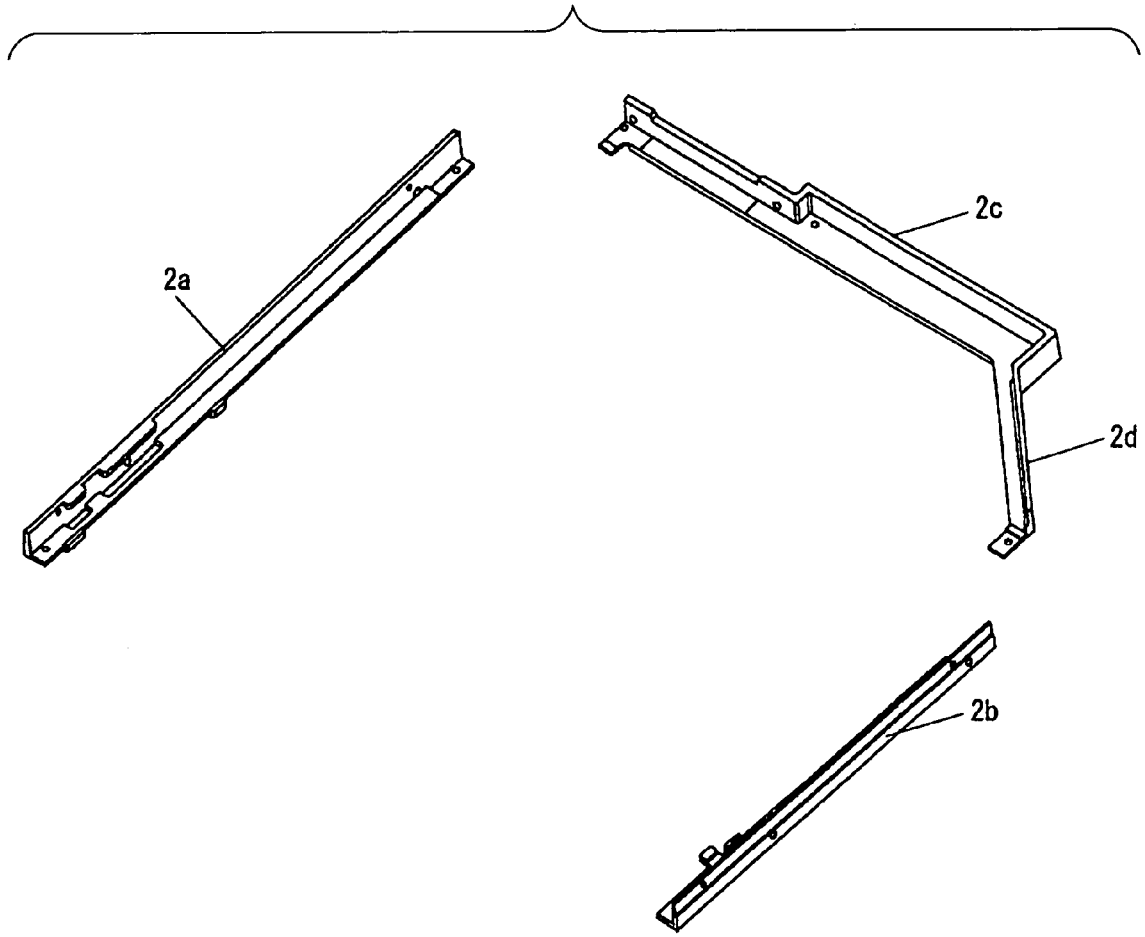
FIG. 16 is a perspective view showing the optical disk unit in another embodiment of the invention.

Furthermore, while the support frame 2 was integrally formed, and the lateral portions 2a, 2b and the connecting portion 2c were formed into a continuous structure, as shown in FIG. 16, it is acceptable that each of the lateral portion 2a, lateral portion 2b, and connecting portion 2c including the inclined portion 2d is formed separately, and each of the portions is fixed using bonding means such as adhesion, welding and screwing, thereby the support frame 2 is formed. It is also acceptable that the inclined portion 2d is formed integrally with the lateral portion 2b, and the connection portion 2c is formed to be rod-like, and then respective portions are connected with each together, thereby it is formed.

Next, loading/ejection operation of the disk tray in the optical disk drive unit configured as above is described using FIG. 1 to FIG. 6.

First, in the ejection operation of the disk tray 1, a user push down the ejection button 10, thereby the disk tray 1 is slightly jumped out from the support frame 2 by a not-shown locking release mechanism, and thus an ejectable condition of the disk tray from the support frame 2 is made, and furthermore, the user holds the front portion of the disk tray 1 with its hand and draws it in a front direction, thereby transfer of the optical disk into and from the rotational driving mechanism 3 becomes possible. At that time, the disk tray 1 slides on the rails 6 and 7 until the seizing claws 21a and 17 contact to the key-shaped portions 6b and 18 respectively, and the rails 6 and 7 slides on both insides of the sides of the support frame 2 until the seizing claws 11 and 15 contact to the key-shaped portions 12 and 16 respectively, therefore the disk tray 1 is ejected only to a predetermined position.

Next, in the loading operation of the disk tray 1, the user pushes the front portion of the disk tray 1, thereby the disk tray 1 slides on the rails 6 and 7, and the rails 6 and 7 slide on the insides of the sides of the support frame 2, thereby the disk tray is loaded into the support frame 2 and held by a not-shown locking mechanism.

In this way, according to the embodiment, since the support frame 2 is formed from a frame that continuously encloses both the sides and the back when the disk tray 1 is loaded, the conventional configuration where the disk tray 1 is covered by the bottom cover from the bottom, and furthermore, covered by the upper cover from the top need not be used, and an optical disk drive unit having a thickness of 9 mm or less, and preferably 7.5 mm or less, which was limitable in the conventional construction, can be configured.

Since, inside profiles of both the sides of the support frame 2 is combined with profiles of conventional resin rail guides, the rail 6 or the rail 7 can be seized movably in a predetermined range directly to the support frame 2, consequently weight and cost can be reduced.

Second Embodiment

Figure 7:
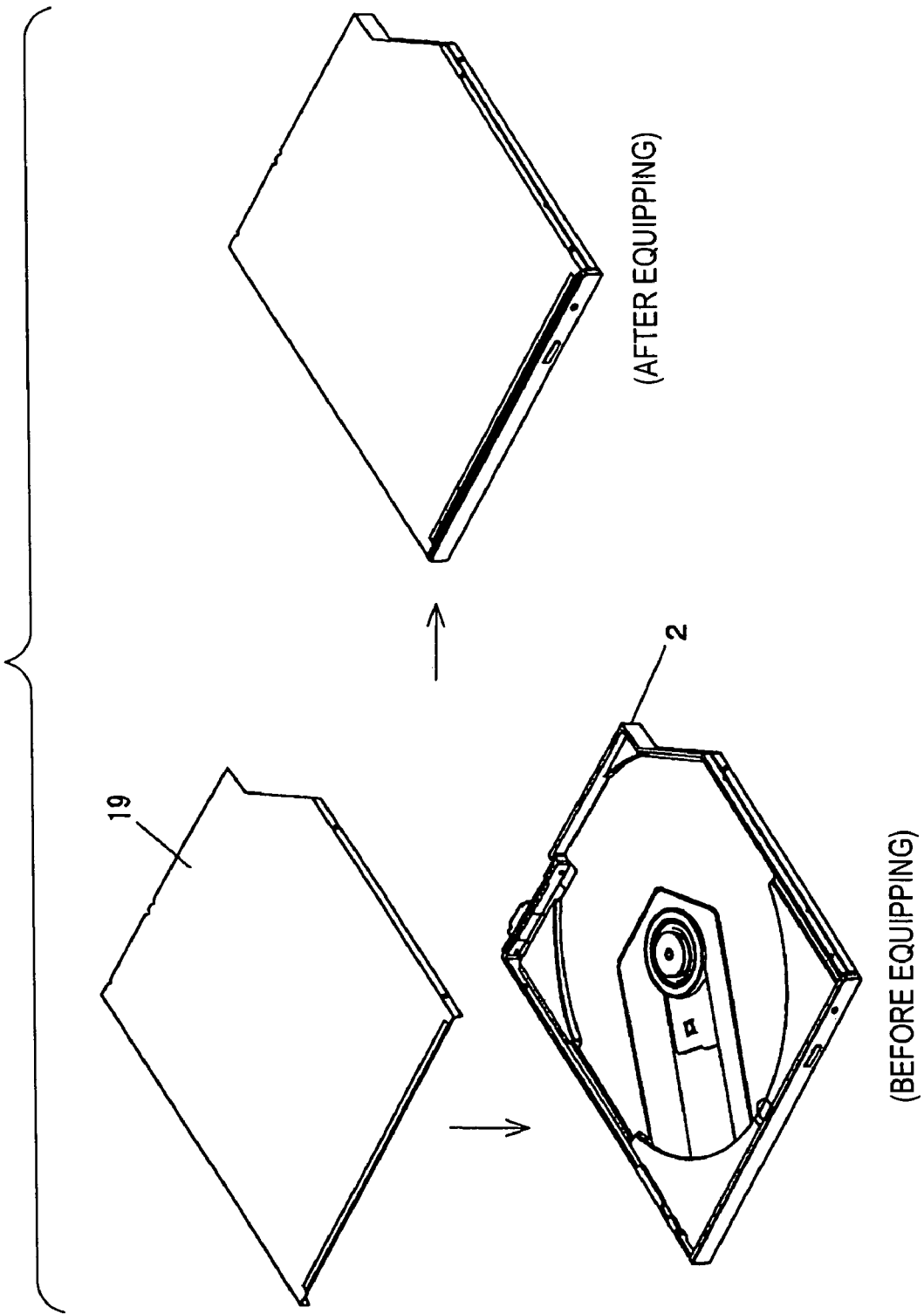
FIG. 7 is a perspective view of the optical disk drive unit with the upper cover in the second embodiment of the invention.
Figure 8:
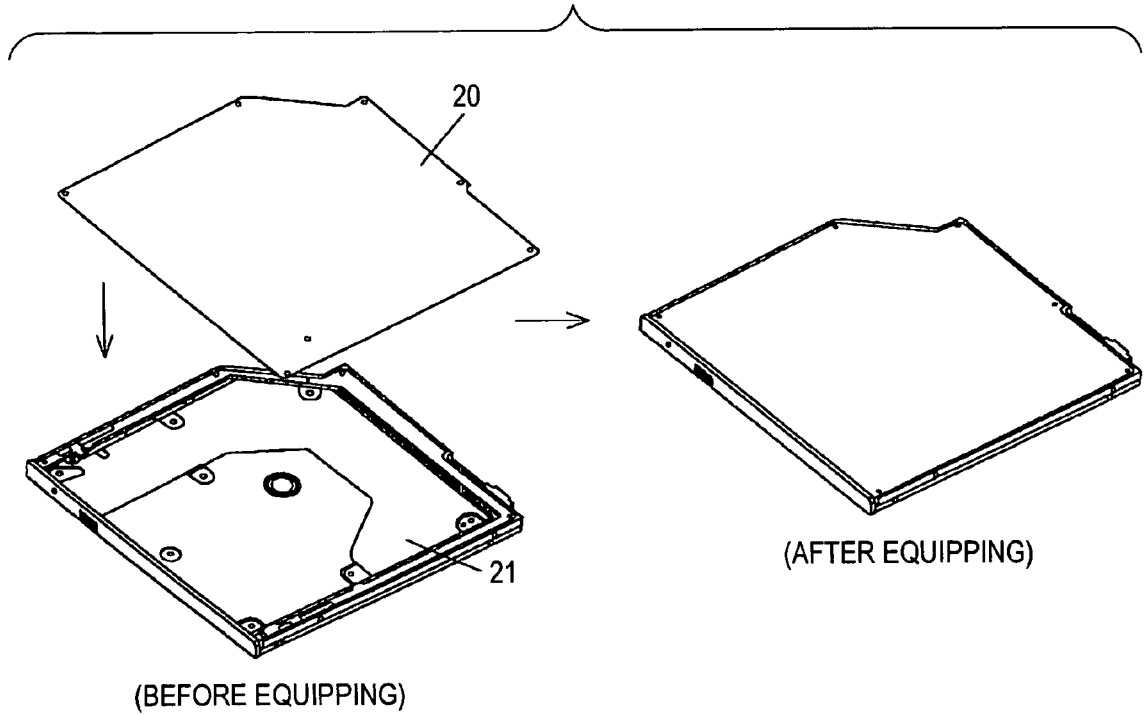
FIG. 8 is a perspective view of the optical disk drive unit with the bottom cover in the second embodiment of the invention, seen from the back.
Figure 9:
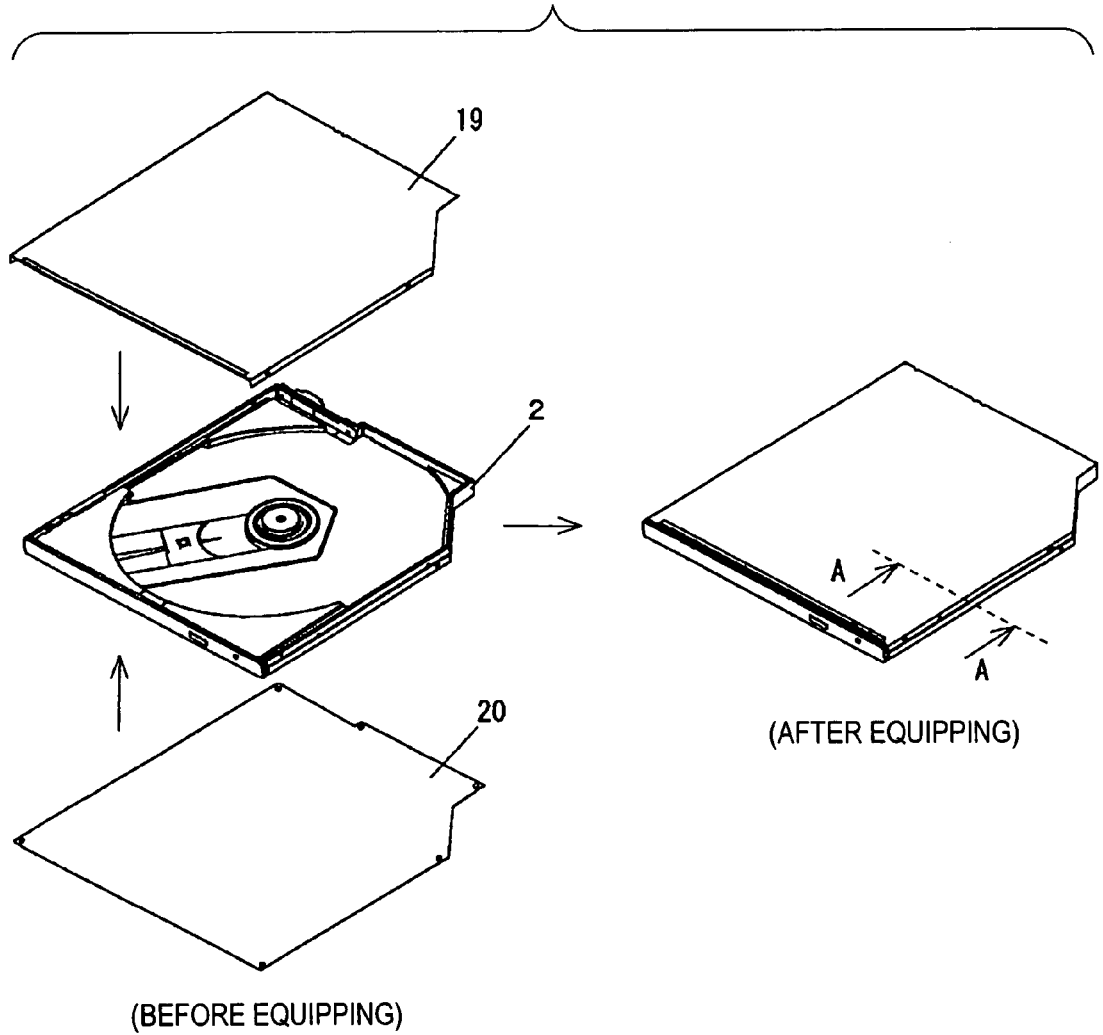
FIG. 9 is a perspective view of the optical disk drive unit with the upper cover and the bottom cover in the second embodiment of the invention.

FIG. 7 is a perspective view of an optical disk drive unit with an upper cover in a second embodiment of the invention; FIG. 8 is a perspective view of an optical disk drive unit with a bottom cover in the second embodiment of the invention, seen from a back; FIG. 9 is a perspective view of an optical disk drive unit with the upper cover and the bottom cover in the second embodiment of the invention; and FIG. 10 is a partial section view along A-A of FIG. 9.

As shown in FIG. 7, 9 is the upper cover.

As shown in FIG. 8, 20 is the bottom cover, and 21 is a tray cover for protecting the back of the disk tray.

Figure 10:
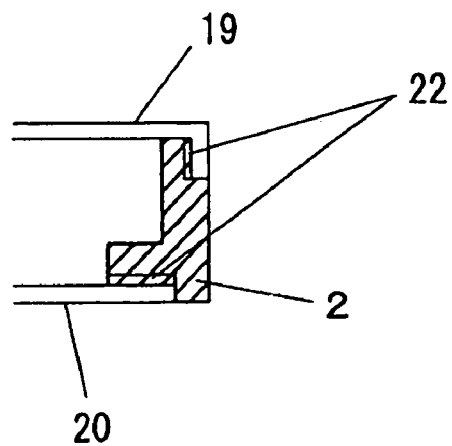
FIG. 10 is a partial section view along A-A of FIG. 9.

As shown in FIG. 10, 22 is a conductive adhesive.

Next, fixation of the upper cover and the bottom cover to the optical disk drive unit configured as above is described using FIG. 7 to FIG. 10.

Regarding the upper cover 19 and the bottom cover 20, in accordance with internal construction of the laptop PC, or demands including dust control and assembling workability, only the upper cover 19 can be equipped on the support frame 2, as shown in FIG. 7, or only the bottom cover 20 can be equipped on the support frame 2 as shown in FIG. 8, or both the upper cover 19 and the bottom cover 20 can be equipped on the support frame 2 as shown in FIG. 9. While the upper cover 19 or the bottom cover 20 can be selectively equipped on the support frame 2 in this way, breakdown of circuits in the optical disk drive unit due to electric noise held in the upper cover 19 or the bottom cover 20 needs to be prevented. Therefore, as material of the upper cover 19 or the bottom cover 20, metal including iron, aluminum, and magnesium is used, and furthermore, the fixation to the support frame 2 is performed using a sheet-type or liquid-type conductive adhesive 22 as shown in FIG. 10, or by not-shown laser or spot welding, or by calking so that earth ground (grounding) is secured. Since strength of the optical disk drive unit as a whole is secured by the support frame 2 during operation or actuation, thickness of the upper cover 19 or the bottom cover 20 can be made smaller than conventional thickness of 0.4 mm to 0.5 mm, for example, 0.3 mm, and even if the upper cover 19 or the bottom cover 20 is equipped, thickness of the optical disk drive unit in a direction perpendicular to a data recording surface of the optical disk can be controlled lower than the conventional thickness.

In this way, according to the invention, since the strength of the optical disk drive unit is secured by the support frame, the upper cover 19 or the bottom cover 20 can be selectively equipped in accordance with the internal construction of the laptop PC, or the demands including the dust control and the assembling workability.

Moreover, even if the upper cover 19 or the bottom cover 20 is equipped, since the strength of the optical disk drive unit is secured by the support frame, the thickness of the cover can be made smaller than the conventional thickness of 0.4 mm to 0.5 mm, consequently thickness of the optical disk drive unit can be reduced.

Figure 17:
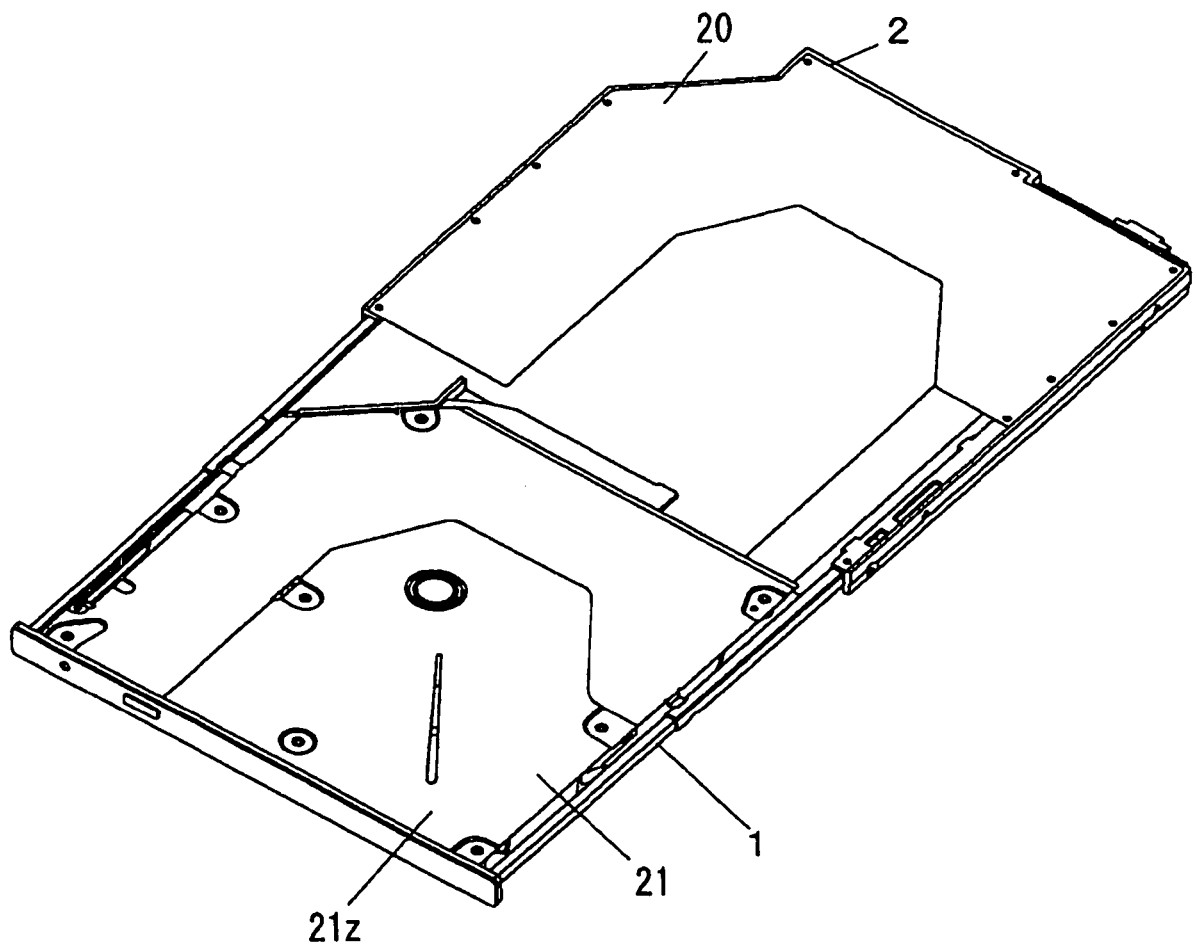
FIG. 17 is a perspective view showing the optical disk unit in another embodiment of the invention.

Moreover, as shown in FIG. 17, it can be configured that when a swelling portion 21z in a predetermined pattern is provided in the tray cover 21 for weight saving or thickness reduction, a bottom cover 20 having a cutout portion in an approximate or a similar pattern to the swelling portion 21z is equipped to the support frame 2, thereby portions other than the swelling portion 21z of the tray cover 21 are covered.

Third Embodiment

Figure 18:
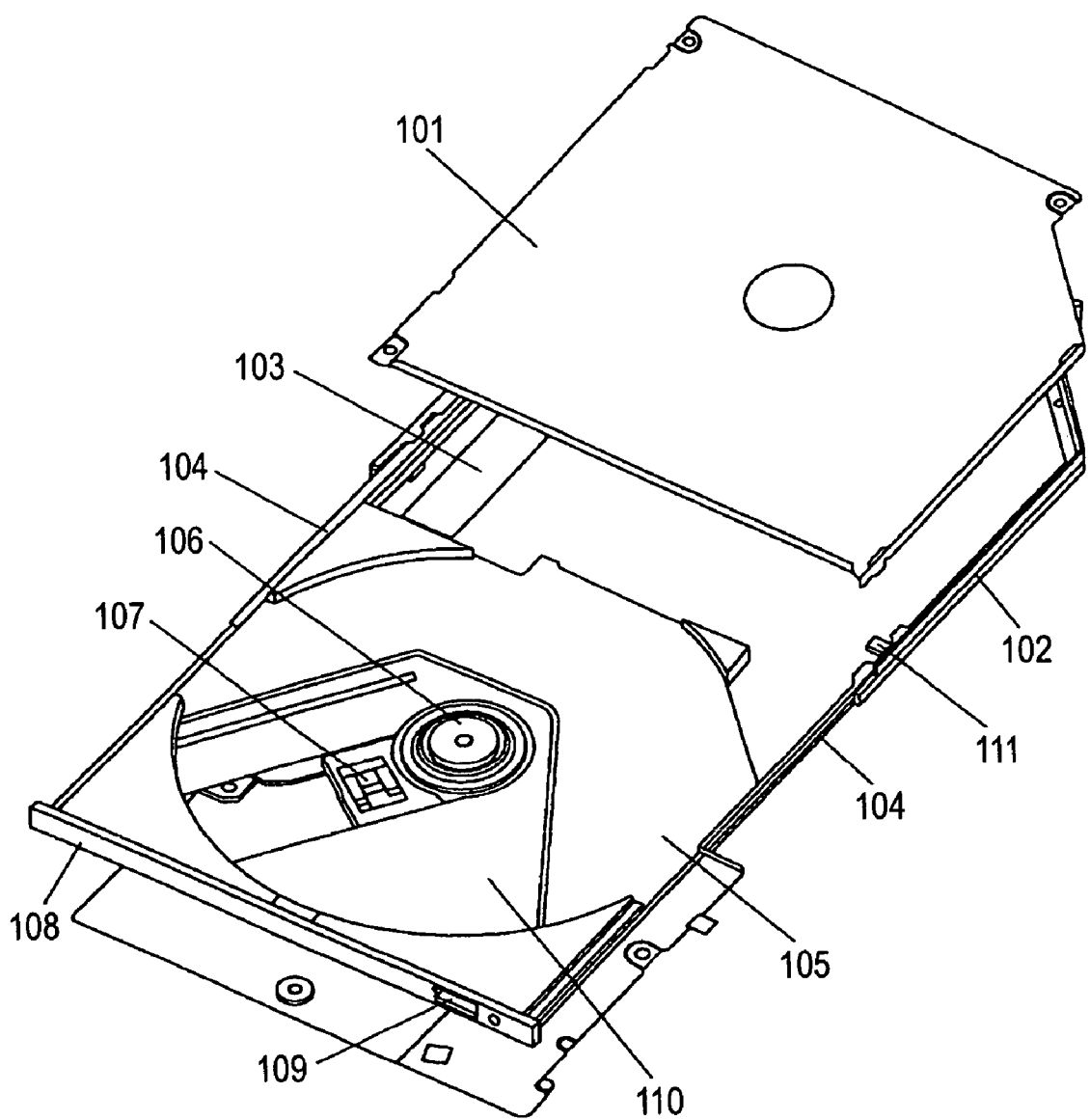
FIG. 18 is an overall view of a disk unit of the invention.
Figure 19:
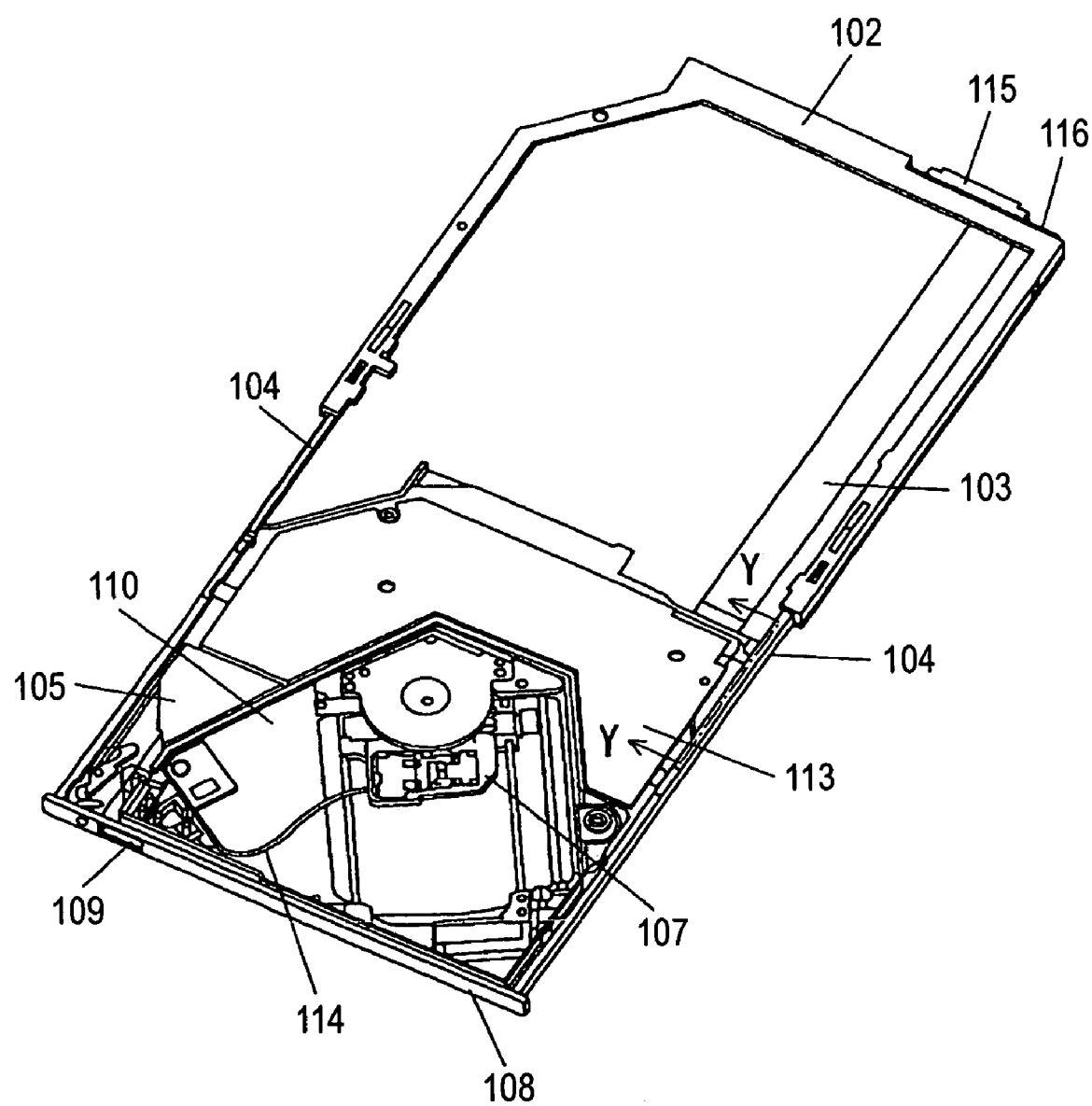
FIG. 19 is a back view of the disk unit of the invention.
Figure 20:
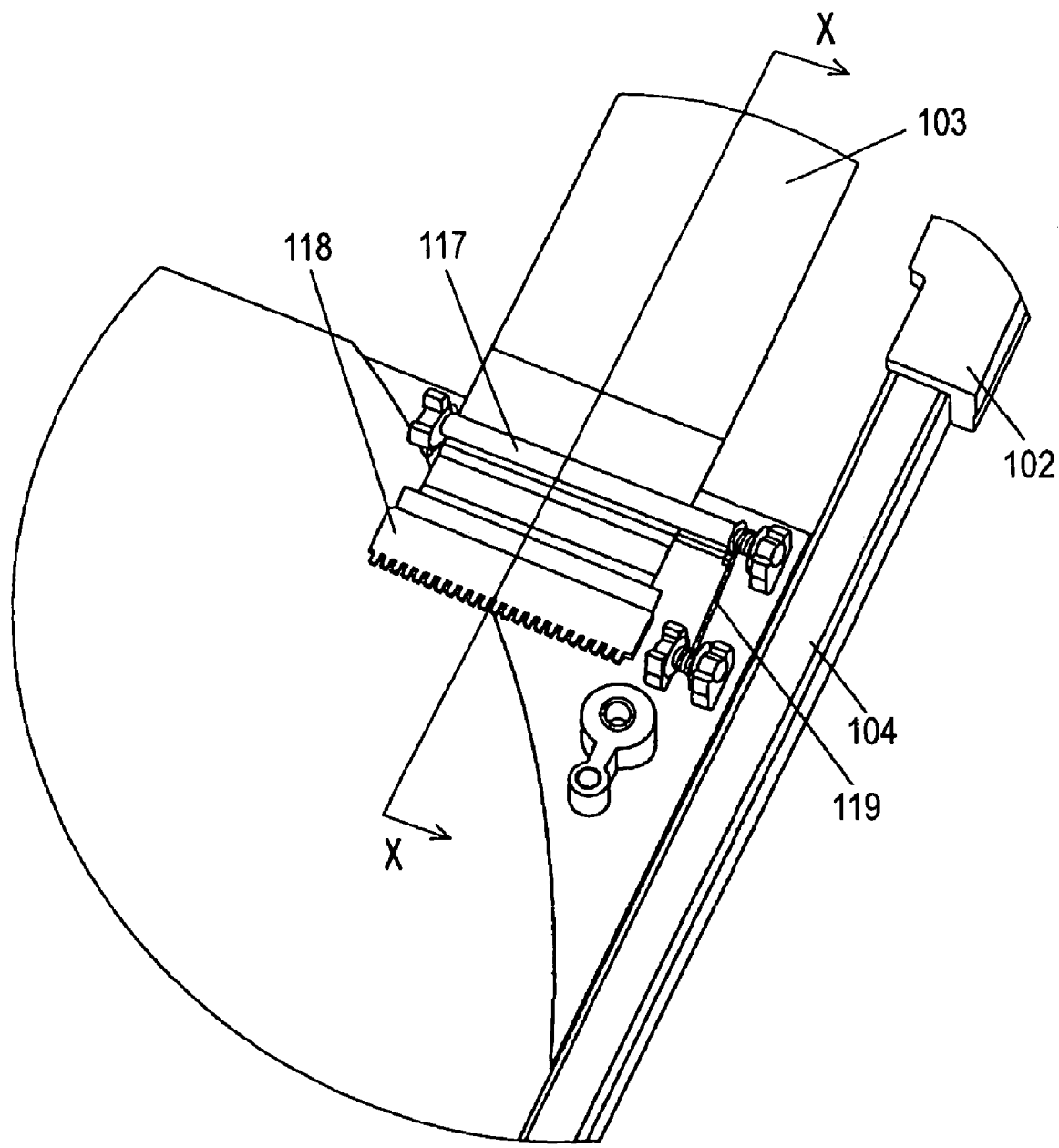
FIG. 20 is a circumferential view of a winding portion of a flexible board.
Figure 21:
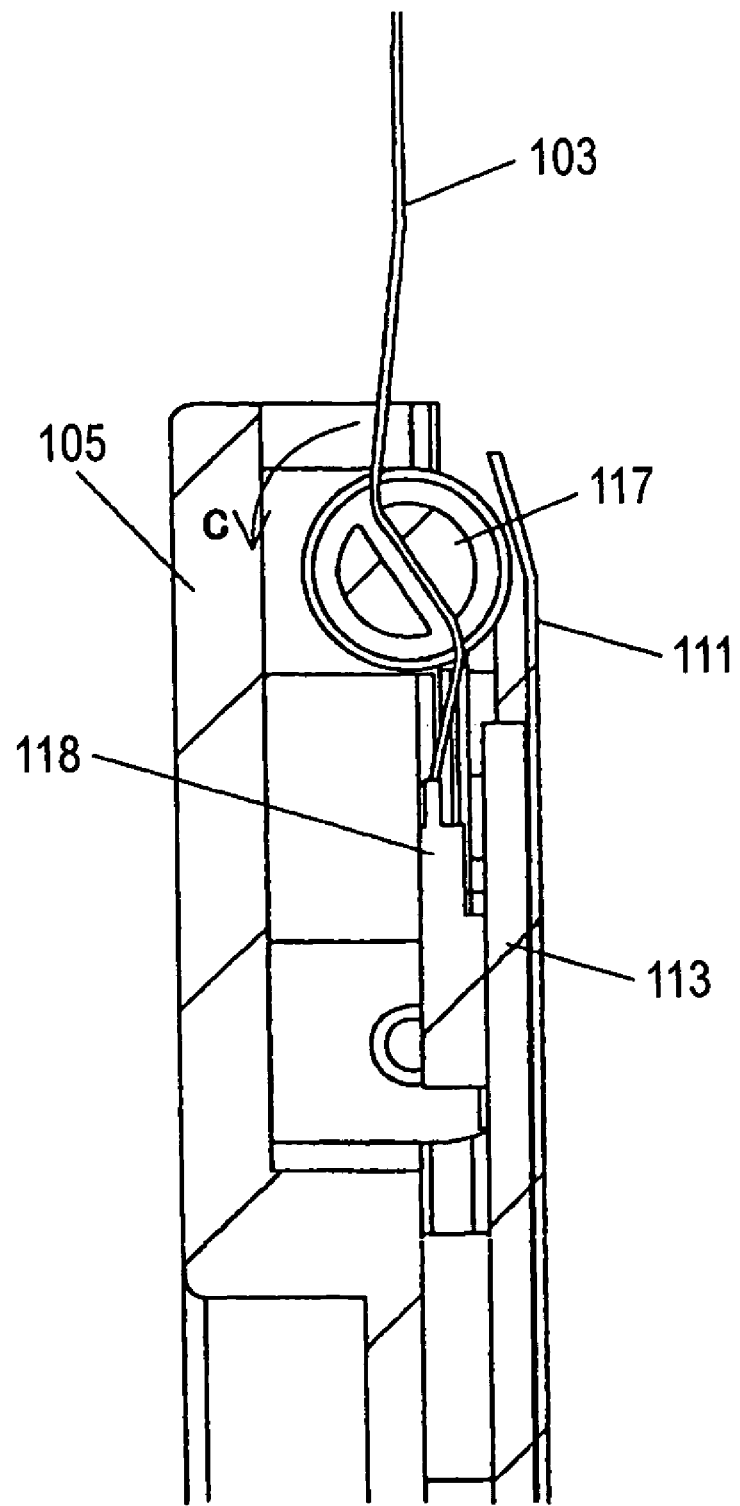
FIG. 21 is a cross section view along a line X-X of FIG. 3.
Figure 22:
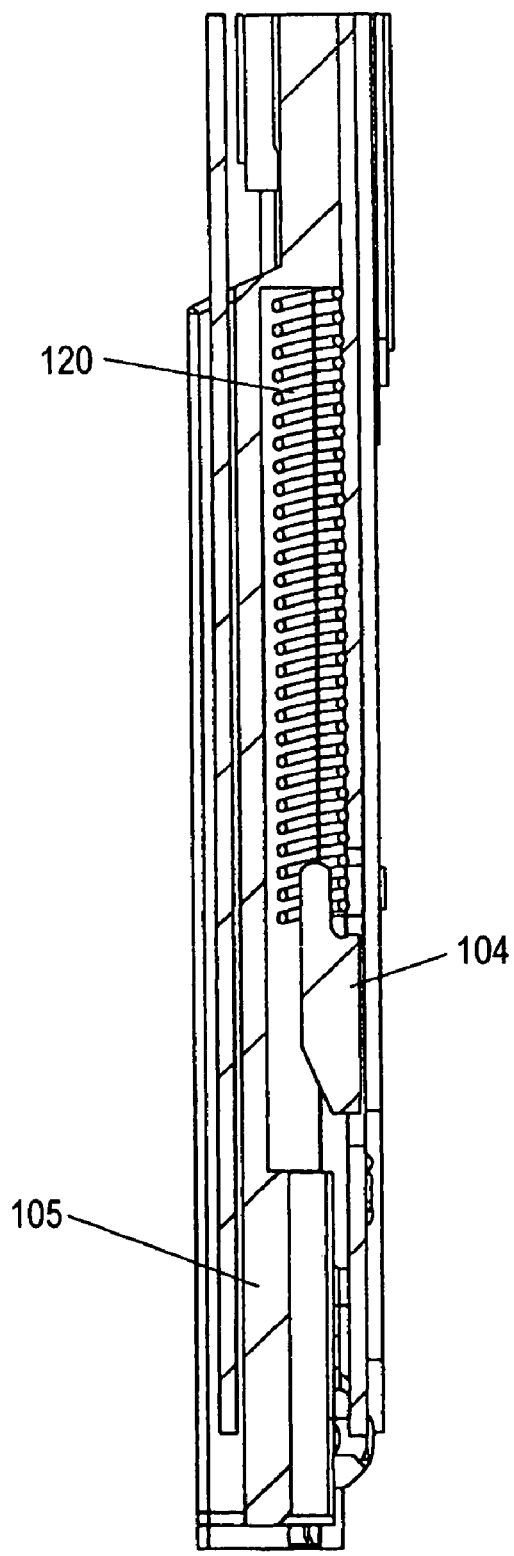
FIG. 22 is a cross section view along a line Y-Y of FIG. 2.
Figure 23:
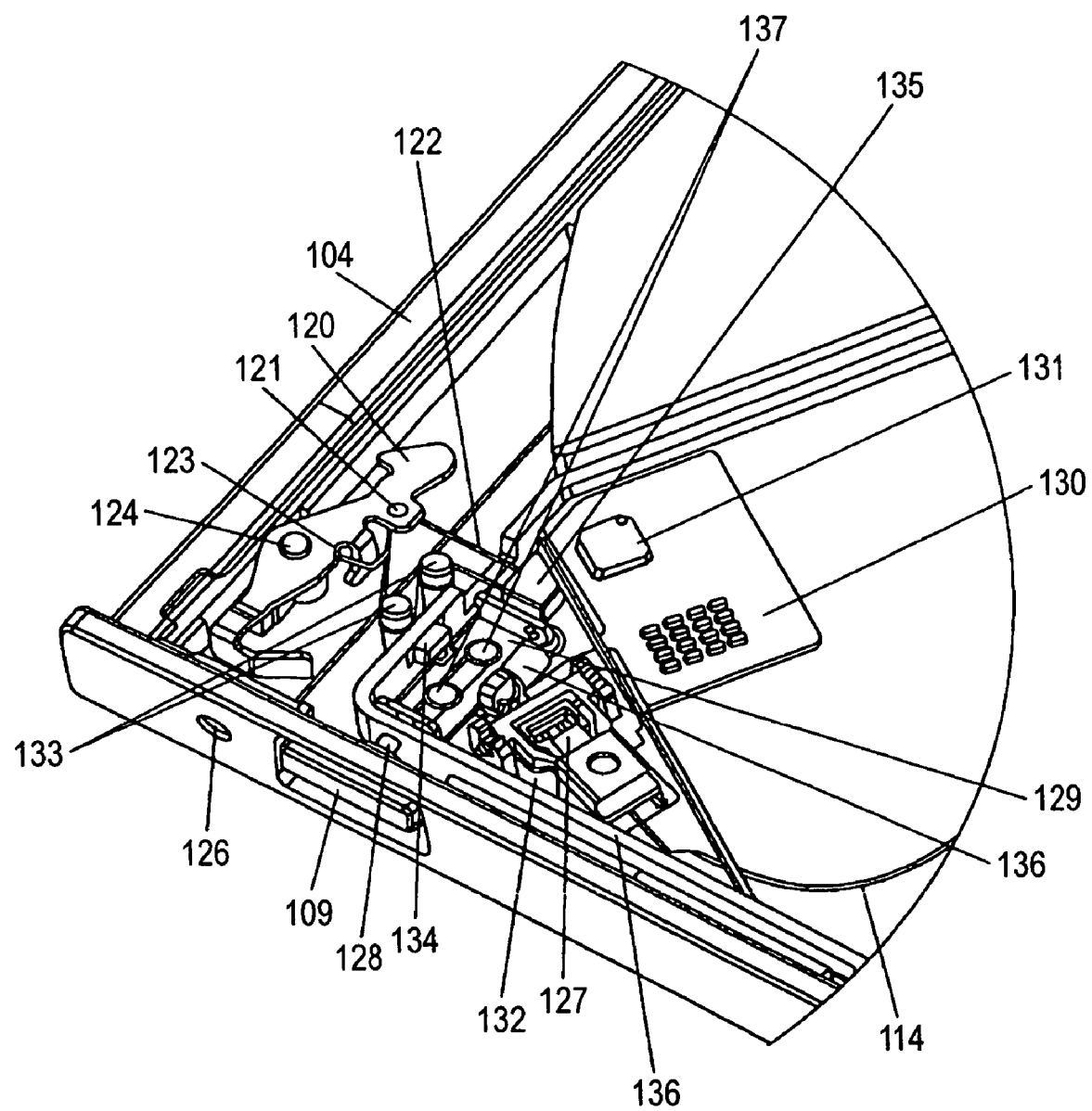
FIG. 23 is an enlarged view of neighborhood of light-emitting means and carrying-means fixation means.
Figure 24:
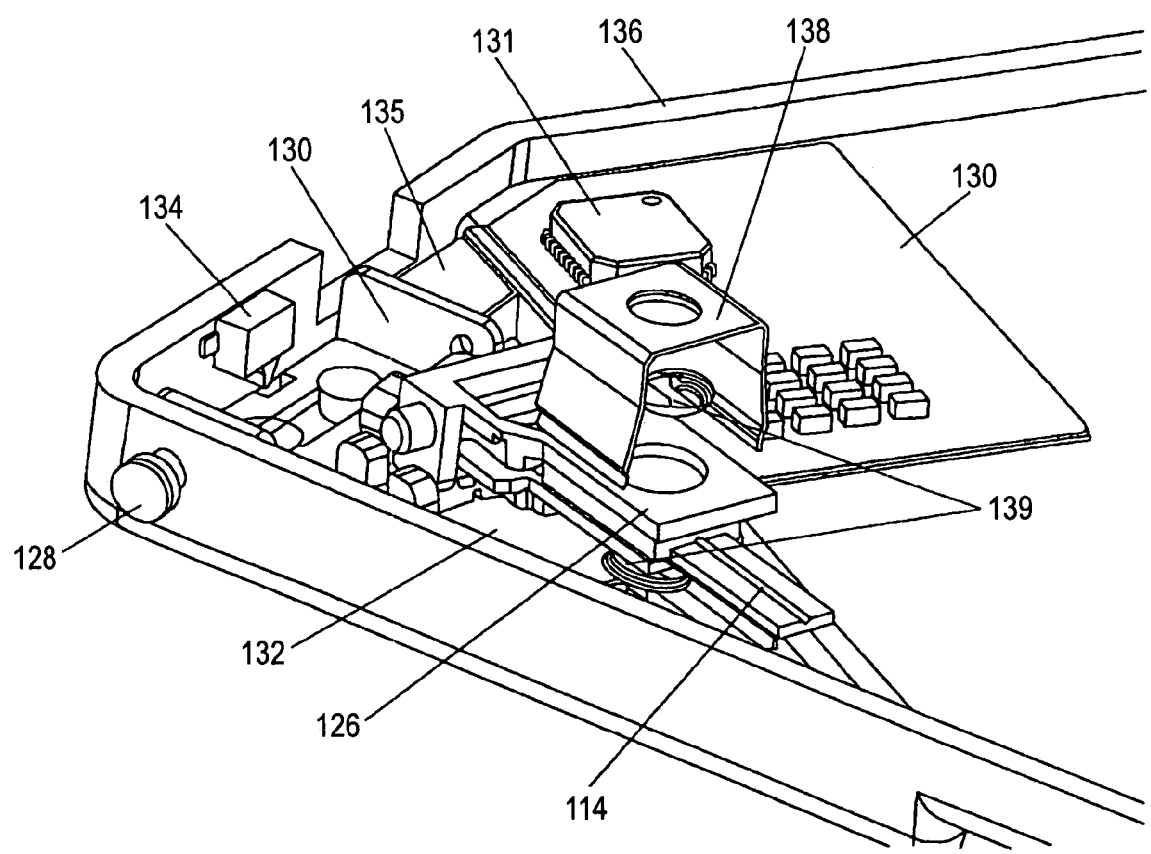
FIG. 24 is an exploded view of neighborhood of the light-emitting means.
Figure 25:
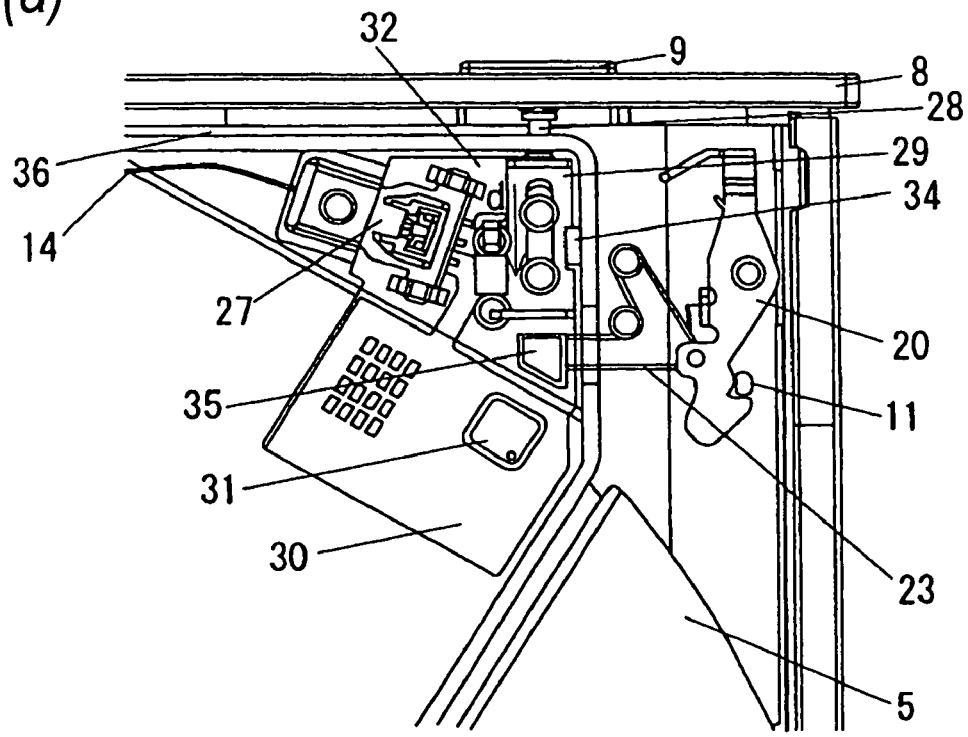
FIG. 25 is an illustrative view of operation of the carrying-means fixation means.
Figure 25:
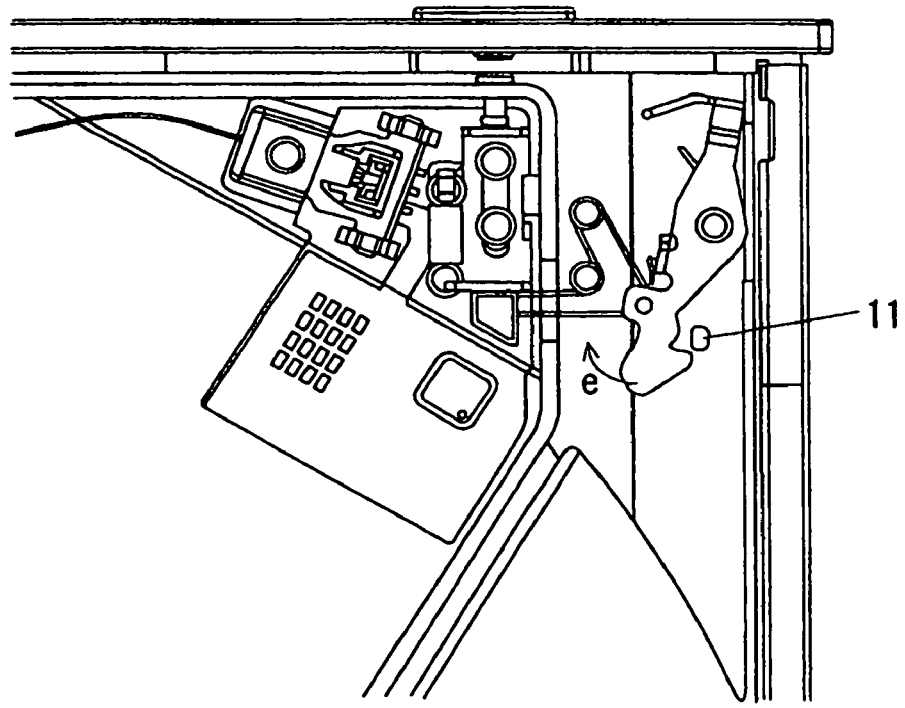
Figure 26:
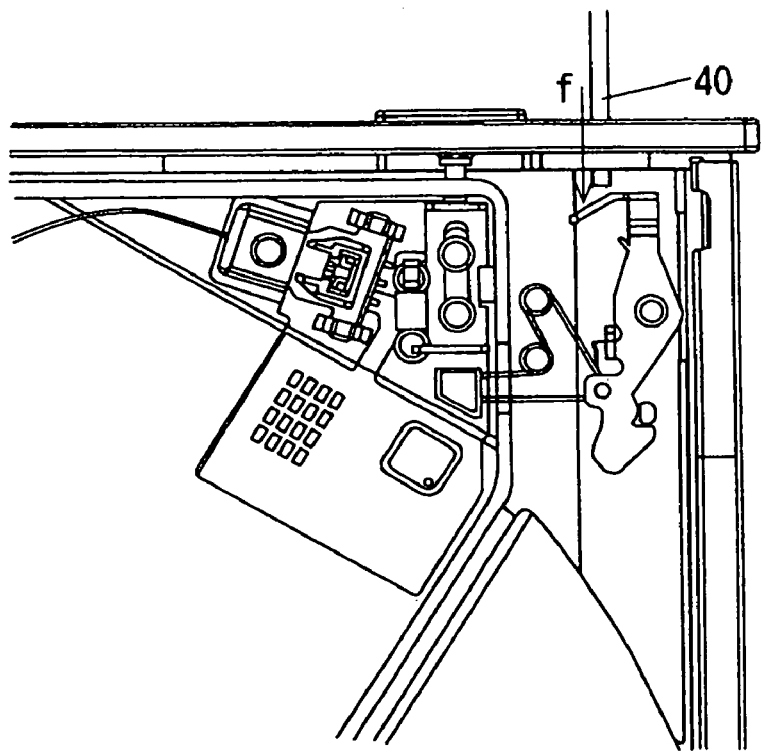
FIG. 26 is an illustrative view of carrying-means forced-removal operation.
Figure 26:
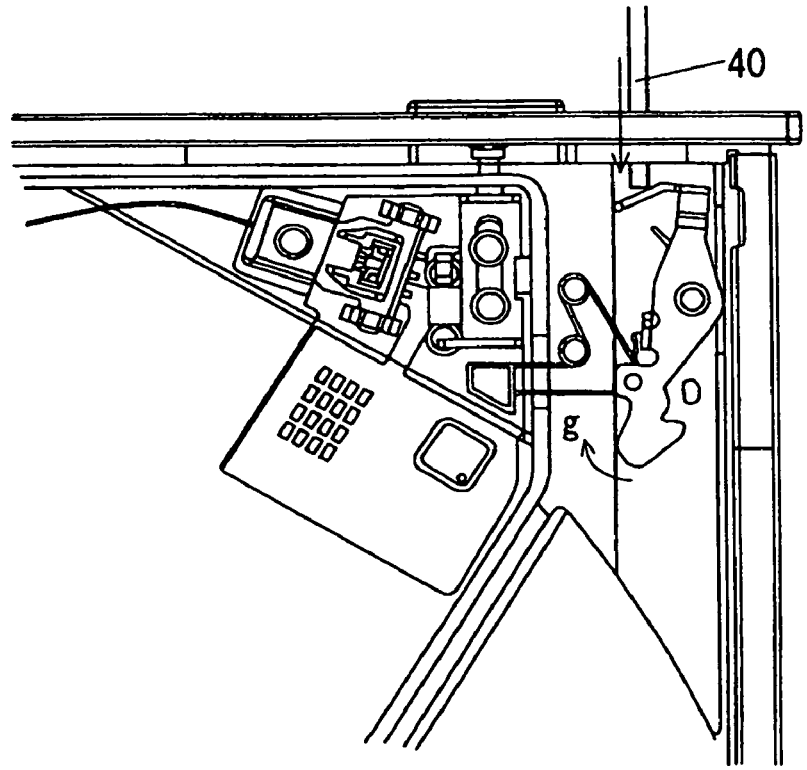

Hereinafter, an embodiment of the invention is described using drawings. FIG. 18 is an overall view of the disk unit of the invention. FIG. 19 is a back view of the disk unit of the invention. FIG. 20 is a circumferential view of a flexible-board winding portion of the invention. FIG. 21 is a cross section view along a line X-X of FIG. 20. FIG. 22 is a cross section view along a line Y-Y of FIG. 19. FIG. 23 is an enlarged view of neighborhood of light-emitting means and carrying-means fixation means. FIG. 24 is an exploded view of neighborhood of the light-emitting means. FIG. 25 is an illustrative view of operation of the carrying-means fixation means. FIG. 26 is a view showing carrying-means forced-removal operation. In FIG. 18, 101 is an upper cover for covering an entire body; 102 is a frame forming an entire drive; and the frame 102 is formed from a die cast or a sheet metal member having improved stiffness through additional drawing. 103 is a flexible board for coupling of a relay board for coupling between a main board and an external PC; 104 is a rail for connecting between the frame 102 and carrying means 105; 105 is carrying means of a disk, which is called tray; 106 is a spindle motor for rotating the disk; 107 is an optical pickup for reading data written into the disk or writing the data into the disk; 108 is a bezel that is attached to a front of the drive, exposed from a surface of a laptop PC, and forms a part of a chassis of the laptop PC; 109 is an ejection button that instructs to release the carrying-means fixation means when the carrying means is removed from a body; 110 is a pickup module that includes a spindle motor, light-emitting means, and an optical pickup, and has a function of carrying the optical pickup in a normal direction to the disc, thereby reading all data in the disk, or writing the data into the disk; 111 is a fixation pin that acts as a hook when the carrying means is remained within the frame 102; and 112 is a tray cover that is equipped from a bottom side of the carrying means 105 and acts to protect the pickup module and the main board. The carrying means 105, which is mounted on the frame 102 via the rail 104, can slide in a back and forth direction as needed when the disk is removed or received.

In FIG. 19 and FIG. 20; 113 is a main board for controlling overall disk unit; 114 is an optical fiber for transmitting light from the light-emitting means to the pickup 107; 115 is an interface connector for coupling between the disk unit and a laptop or desktop PC; 116 is a connector board, attached to the frame 102, for mounting the interface connector; 117 is a FPC winding roller for winding the flexible board 103; 118 is a FPC connector, mounted on the main board 113, for electrical coupling between the flexible board 103 and the main board 113; and 119 is a FPC winding spring that applies constant tension in an arrow direction c in the figure to the FPC winding roller 117, which is motive power for winding the flexible board 103. FIG. 21 is a cross section view along X-X of FIG. 20. As shown in the figure, since the flexible board 103 is always applied with the tension in a direction wound in an arrow direction in the figure, even when the carrying means 105 is removed from the frame 102, the board 103 does not hang in a vertical direction of the disk unit. The tension is set lower than frictional force generated between the carrying means 105 and the rail 104 or the frame 102 when the carrying means 105 is completely removed from the frame 102, thereby even when the carrying means 105 is drawn out, the carrying means 105 does not unintendedly return into the frame 102. Moreover, since some tension for winding the flexible board 103 is applied thereto, when the carrying means 105 is received into the frame 102, assistance can be made on insertion of the carrying means by an operator. By using the structure, a bottom of the frame 102 can be cut out over a large area, as a result height that can be allocated to the pickup module and the main board can be increased, and therefore thickness of the unit as a whole can be reduced.

Forth Embodiment

In FIG. 23 to FIG. 26; 120 is a locking arm for remaining the carrying means 105 within the frame 102; 121 is a locking arm shaft which is fixed to the locking arm 120 by calking and wound with a shape memory alloy wire 122, and acts as a fulcrum for tensionally rotating the locking arm 120 when the carrying means 105 is removed; 122 is the shape memory alloy wire where once it is heated, strain which was generated through previous application of load disappears and a shape returns to the original; 123 is a locking arm spring for rotating the locking arm in a fixation direction of the carrying means 105, and giving the strain previously to the shape memory alloy wire 122; 124 is a locking shaft that acts as a fulcrum of rotation of the locking arm 120; 125 is a forced ejection hole for inserting a member such as pin when the carrying means is removed in a forcible manner rather than in an electrical manner; 127 is a light-emitting means module that incorporates the light-emitting means and acts as a base when the light-emitting means is mounted on the pickup module; 128 is an ejection pin for transmitting motion of the ejection button to a heat transfer plate 129 when the carrying means is electrically removed; 130 is a LD driver for controlling the light-emitting means; 131 is a heat transfer sheet for effectively transferring heat of the light-emitting module 127 and the LD driver 130 to a heat transfer plate 129 and allowing smooth sliding of the heat transfer plate; 132 is a shape-memory-alloy-wire support shaft for hooking the shape memory alloy wire; 133 is a detection switch for detecting movement of the heat transfer plate; 134 is a heat reception block, which is mounted on a base 136 with floating from the heat transfer sheet 131, for transferring heat to the shape memory alloy wire by contacting to the heat transfer plate in a heated state; 135 is a transfer plate return spring for pulling the heat transfer plate in an arrow direction in the figure such that the heat transfer plate does not contact to the heat reception block 134 in normal time; 136 is a base for forming an overall pickup module; 137 is a heat-transfer-plate support shaft for supporting the heat transfer plate 129 on the base 136; and 138 is light-emitting-means support sheet-metal for supporting the light-emitting means module via a light-emitting-means module support spring 139.

Next, operation of the disk unit configured as above is described using FIG. 22 to FIG. 25.

When the carrying means 105 is removed from the disk unit for removal or loading of the disk, first, the operator pushes the ejection button 109. Once the ejection button 109 is pushed, the ejection pin 128 and the heat transfer plate 129 contacting to the ejection pin 128 move in a d direction in FIG. 25(a) in an interlocking manner with the motion. A switch portion of the detection switch 134, which enters a cutout portion provided in the heat transfer plate 129 in an initial state, runs over a portion other than the cutout portion as the heat transfer plate 129 moves, thereby the state is changed into a switch-on state. In the switch-on state, according to an instruction from the main board, the light-emitting means module 127 and the LD driver 130 are actuated at a fixed power or more, thereby the light-emitting means module 127 and the LD driver 130 generate plenty of heat in a short time. Then, the heat is transferred to the heat transfer plate 129 via the heat transfer sheet 131. Finally, the heat of the heat transfer plate 129 is transferred to the heat reception block 134, and then transferred to the shape memory alloy wire 122 attached to the heat reception block 134, thereby strain, which was generated in an extending direction through previous application of load by the locking arm spring 123, disappears and length returns to the original (typically it is shortened about 10%), thereby the locking arm 120 rotates in an e direction in the figure, as a result it is disengaged from a locking pin 141 on the frame 102, therefore the carrying means 105 is released from the fixation to the frame 102, and ejected from the frame 102 by the ejection spring 120 provided between the rail 104 and the carrying means 105. After ejecting the carrying means 105, since the operator releases its hand from the ejection button 109, the heat transfer plate 129 returns to the initial state by the heat-transfer-plate return spring 135. Accordingly, the heat reception block 134 quickly loses the retaining heat, and the shape memory spring coupled thereto is pulled by the locking arm spring 123 again, therefore a returnable condition to the condition where the carrying means 105 can be fixed is given.

Even if the disk unit can not be applied with electric current due to trouble such as battery death, as shown in FIG. 25(a) and FIG. 25(b), a forced ejection pin 140 that is a member such as thin pin is inserted through the forced ejection hole 125 in a f direction in the figure, thereby the locking arm 120 is rotated in a g direction in the figure, and thereby the carrying means 105 can be released from the fixation to the frame 102.

When Joule heat due to the electric current applied from an electric circuit such as the light-emitting-means driving circuit is used for the heat needed when the shape memory alloy wire is actuated, terminals are provided on the board mounted with the LD driver 130, and both ends of the shape memory alloy wire 122 are fixed to the terminal portions by a method such as welding, and a fixed level of electric current is applied as required, thereby the same function can be given. Since a structure of it is similar to the above, detailed description is omitted here.

From the above, when the carrying-means fixation means and release means of the invention are used for the disk unit, an actuator having a small projection area and small thickness compared with conventional one can be formed, as a result reduction in thickness of the disk unit can be realized.

This invention can be constructed by combining each of the embodiments to each other.

Since the invention is configured to hold the disk tray by the support frame, the disk tray is supported by a support frame having extremely small thickness and maximally removed useless-portions, therefore it is suitable for an optical disk unit that enables weight saving.

The disk unit according to the invention can be suitable for the information disk unit related to optical read and write including MO, PD, CD, CD-ROM, CD-R, CD-RW, DVD-ROM, DVD-RAM, ±RW, and ±R, to which reduction in thickness is required.

This application is based on and claims the benefit of priority of Japanese Patent Application No2004-196544 filed on Jul. 2, 2004, Japanese Patent Application No2004-318988 filed on Nov. 2, 2004, the contents of which are incorporated herein by references in its entirety.

What is claimed is:

1. An optical disk unit, comprising:
 a frame, having a pair of first bars provided at positions opposed to each other, and a second bar to connect the pair of first bars, said frame being in a rectangular shape having an opened portion in a side;
 a disk tray, provided movably on the frame;
 a motor, provided on the disk tray, to rotate an optical disk; and
 an optical head, provided on the disk tray, to perform recording and/or reproduction of data by irradiating light onto the optical disk;
 wherein the disk tray is held only by the frame, and when the frame holds the disk tray, front and back surfaces of the disk tray are exposed.

2. The optical disk unit according to claim 1, wherein rails are provided between the pair of first bars and the disk tray; and
 the disk tray is movably provided on the frame.

3. The optical disk unit according to claim 1, wherein cross sections of the pair of first bars and the second bar are L-shaped.

4. The optical disk unit according to claim 1, wherein the pair of first bars and the second bar are integrally formed.

5. The optical disk unit according to claim 1, wherein one of the first bars is provided with a parallel portion that is parallel to the other of the first bars, and further provided with an inclined portion that is inclined to the other of the first bars, and the inclined portion and the second bar are connected.

6. The optical disk unit according to claim 1, wherein a projecting portion, which is provided integrally with the second bar and projected to an inside of the frame, is provided.

* * * * *